United States Patent [19]

Gale et al.

[11] Patent Number: 4,698,562
[45] Date of Patent: Oct. 6, 1987

[54] MOTOR ELECTRICAL POSITIONING SYSTEM AND THE APPLICATION THEREOF WITHIN VEHICLE TRACTION DRIVES

[75] Inventors: Allan R. Gale, Allen Park; David J. Gritter, Southfield, both of Mich.

[73] Assignee: Eaton Corporation, Cleveland, Ohio

[21] Appl. No.: 855,981

[22] Filed: Apr. 24, 1986

Related U.S. Application Data

[63] Continuation of Ser. No. 538,859, Oct. 4, 1983, abandoned.

[51] Int. Cl.$^4$ .......................................... H02K 29/00
[52] U.S. Cl. ................................... 318/254; 318/138; 318/701
[58] Field of Search ................... 318/254, 254 A, 431, 318/138, 701

[56] References Cited

U.S. PATENT DOCUMENTS

| | | | |
|---|---|---|---|
| 3,456,174 | 7/1969 | Moczala | 318/254 |
| 4,431,953 | 2/1984 | Schray et al. | 318/254 |
| 4,455,513 | 6/1984 | Fulton et al. | 318/254 |
| 4,484,114 | 11/1984 | Ebbs | 318/254 |

Primary Examiner—David Smith, Jr.
Attorney, Agent, or Firm—D. A. Rowe; J. G. Lewis

[57] ABSTRACT

A drivetrain (48) for an electric passenger vehicle (10) includes a battery (40) for energizing a single-phase A.C. traction motor (18) which drives a ground engaging wheel (12) through a multispeed transaxle (20). The motor is characterized by an external ferrite permanent magnet rotor (26) drivingly engaging an input shaft (32) of the transaxle. The motor is controlled by an inverter circuit (44) and a control circuit (46) which generates switch command signals to reciprocally actuate power transistors (56) and (62) within the inverter circuit as a function of operator demand, rotor position and rotor speed. The control circuit includes a motor positioning circuit (442) which toggles the motor current when the rotor speed falls below a predetermined level to dither the rotor about a park position for a predetermined period. A prestart rotor positioner (224) is provided to mechanically lock the rotor in its park position to ensure the availability of a high electrical starting torque. Finally, a minimum starting speed circuit (599) provides for motor startup from other than the normal rotor park position.

15 Claims, 28 Drawing Figures

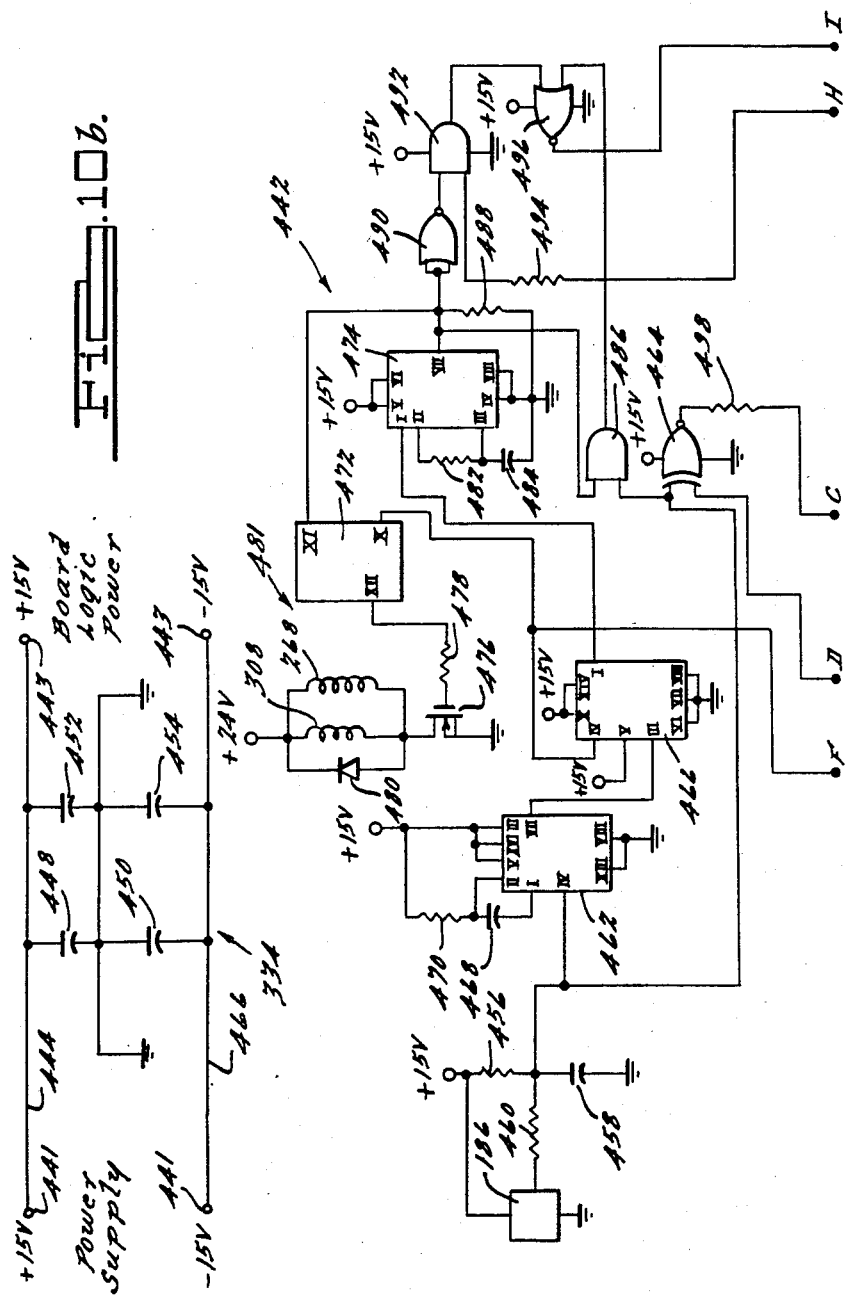

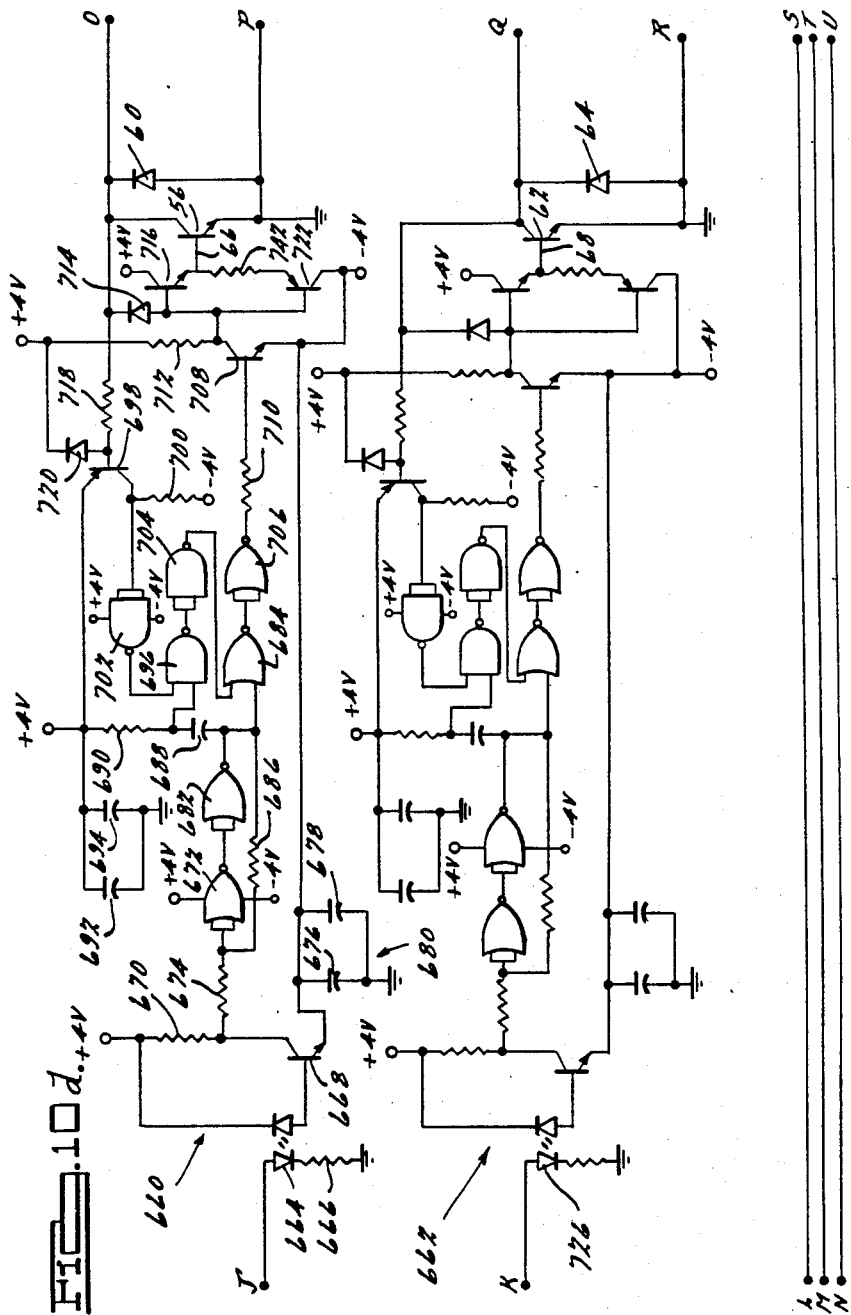

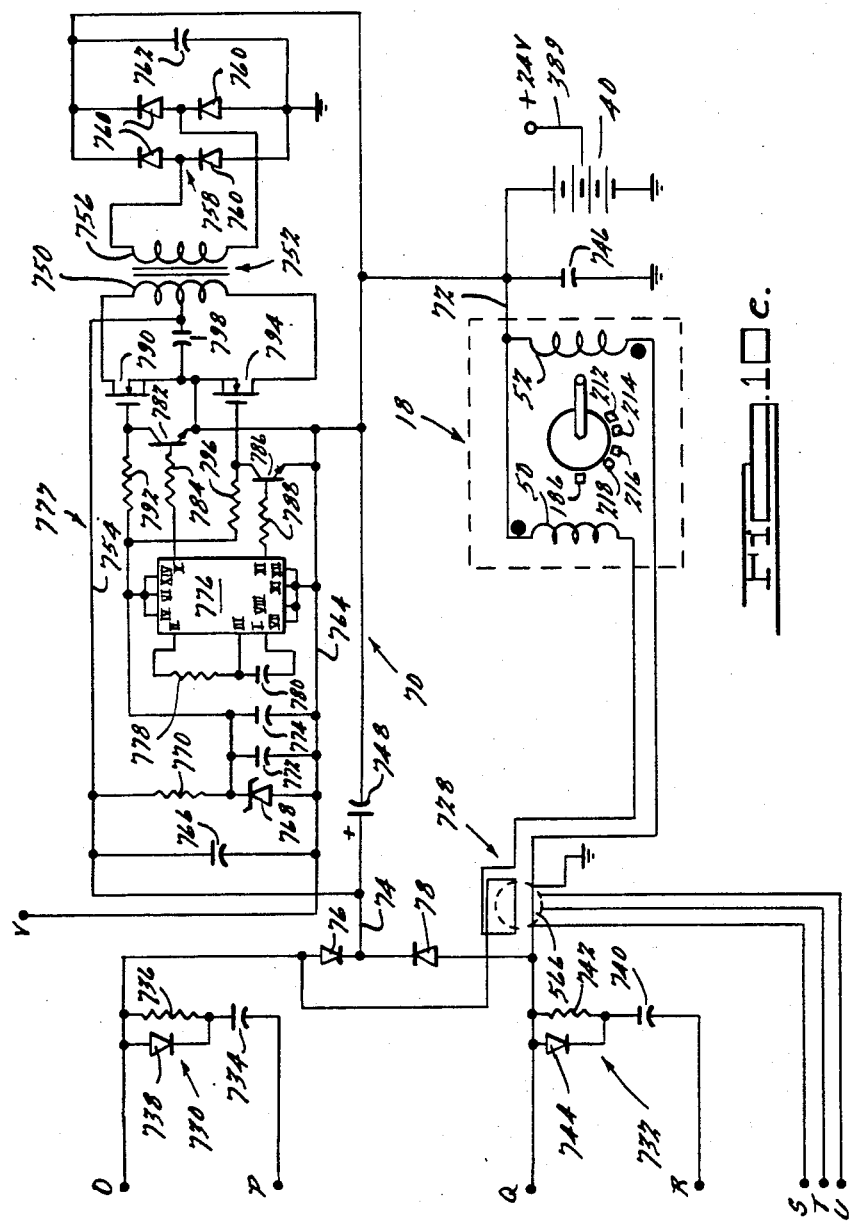

MOTOR ELECTRICAL POSITIONING SYSTEM AND THE APPLICATION THEREOF WITHIN VEHICLE TRACTION DRIVES

This is a continuation of application Ser. No. 538,859, filed Oct. 4, 1983 now abandoned.

FIELD OF THE INVENTION

The present invention relates to traction motors and the application thereof in electric-powered vehicles. Specifically, the application relates to vehicle drivetrains including apparatus to ensure start-up capability under all conditions.

CROSS-REFERENCE

The invention described in the present application is related in certain respects to U.S. Pat. Nos. 4,316,132 and 4,296,650, as well as U.S. Ser. No. 385,633 filed June 7, 1982 and U.S. Ser. No. 397,261 filed July 12, 1982, now U.S. Pat. No. 4,532,460.

BACKGROUND OF THE INVENTION

The electric-powered passenger vehicle has long been considered one of the most attractive alternatives to conventional internal combustion engine driven types from the standpoint of overall efficiency, enivronmental impact and, most recently alternative fuel capability. Many commercial enterprises and private individuals, some under the auspices of the Federal Government, have proposed various approaches to implementing an electrically powered vehicle. To date, there have been virtually no commercially successful vehicles produced on a large scale. A large number of approaches to the implementation and control of an electric vehicle are evidenced in the patent literature. Most of the approaches fall within one of three general categories of motion power source. These categories are hybrids, DC motor drives and induction motor drives. The first type, that most frequently found in the patent literature, is the hybrid vehicle, comprising a small gasoline-fueled internal combustion engine which mechanically drives an electrical generator which, in turn, supplies electrical energy to an AC or DC motor. With this arrangement, the gasoline engine can operate a constant speed (at a relatively high efficiency) and achieve a substantial fuel saving compared with an engine experiencing the conventional wide range of operation. A shortcoming of many hybrids is that they are relatively heavy, requiring an electrical generator and motor as well as the gasoline engine. Additionally, the engine requires substantial amounts of volatile liquid fuel and generates exhaust emissions.

A second approach taken in the development of electric vehicles is the use of a bank of batteries which supply electrical energy to a DC motor. A variable speed motor drive circuit provides easy and versatile control of a vehicle. The principal advantage of this arrangement is that a DC motor control system requires a relatively simple power and control circuit. Unfortunately, this advantage is often more than offset by the relatively large initial cost and maintenance expenses of the motor itself. In addition, DC machinery is relatively heavy and bulky, factors which do not lend themselves well to implementation within a lightweight compact vehicle. Finally, DC motors inherently require choppers and commutators which create sparks and RF pollution which can be controlled only at additional expense.

The third, and most attractive approach from the applicant's viewpoint, is a vehicle employing a battery bank and an A.C. motor. A.C. motors are relatively lightweight, inexpensive and efficient when compared to D.C. motors. A.C. motors, with no brushes or commutators, are more rugged and reliable then their D.C. counterparts and require substantially less maintenance. Related to the power-to-weight ratio is the fact that A.C. machines can be driven at substantially greater speeds than D.C. motors. Because A.C. motors do not generate sparks, they can readily be employed in dusty, explosive and highly humid atmospheres or high altitudes. Additionally, A.C. motors can be liquid cooled if the application so requires. Although typically superior to D.C. motors in electric vehicle applications, A.C. motors often require complex control circuits which are dedicated to associated vehicle drivetrains and can be extremely bulky and expensive. To date, virtually all A.C. electric vehicles have employed multi (usually three) phase design strategies. Although three-phase machinery has many advantages as set forth hereinabove, three-phase inverter costs and complexity have proven to be extremely high. In relatively large load applications, such as that required in a passenger vehicle, appropriately sized solid state switching devices such as SCR's of transistors are often extremely expensive. In addition, three-phase inverters, by their nature, dictate a multiplicity of components, including switching devices, again increasing system cost.

Single-phase permanent magnet motors have not been widely accepted for traction drive applications because they share the characteristic of all single-phase Ac motors in that no starting torque may be available. A related problem is found in such machines ability to start in either direction, requiring the provision of expensive direction governors. To ensure start-up, many electrical and mechanical approaches, such as pole shaving and kick-starting, have been suggested. With pole shaving, each pole is ground so that the air gap increases circumferentially across the pole face to effectively shift the reluctance torque zero point from the electrical torque zero point. A motor with shaved holes can, however, still fail to start such as when the rotor is positioned where the electrical torque is zero due to the slope that the vehicle is parked upon. With kick-starting, an actuator mechanically rotates the rotor a few degrees at the same time electrical power is applied. This method has problems, because logic must be provided to sense which direction the motor should be pushed. Although effective for limited applications, these methods have proven to be unduly expensive or limited to small, fractional horsepower motor applications.

It will be apparent from the reading of the Specification that the present invention may be advantageously utilized in many different traction drive applications, especially land vehicles. However, the invention is especially useful when applied to electric-powered passenger commuter vehicles and will be described in connection therewith.

BRIEF DESCRIPTION OF THE INVENTION

The present invention represents a low-cost alternative to DC traction motors in electric road vehicles and overcomes many of the above-described shortcomings of the prior art by providing, in the broadest sense, a power source which energizes a single-phase brushless motor which, in turn, imparts torque to at least one tractive wheel of the vehicle. An inverter interconnects the power source and motor and energizes the motor in response to switch command signals received from a control circuit. The control circuit senses operator demand and generates the switch command signals as a function thereof. Finally, a motor positioning circuit senses rotor speed and effects rotor positioning at a fixed orientation by selectively toggling motor current when sensed rotor speed is below a predetermined rate. This arrangement ensures that the rotor will be positioned to provide a starting torque upon subsequent energization by electrically "parking" the rotor.

In the preferred embodiment of the invention, the positioning is manifested as a rotor oscillation or dithering about the fixed orientation.

In the preferred embodiment of the present invention, the motor positioning circuit is provided with a timer to establish a rotor parking time interval. In addition, a mechanical rotor positioner is provided which selectively limits rotational freedom of the rotor during the parking interval in response to an energization signal generated by said motor positioning circuit. This arrangement allows for the controller/inverter to be de-energized after rotor parking while ensuring subsequent motor start-up.

In the preferred embodiment of the present invention, a flag carried by the rotor is maintained in rotational alignment with a sensor which outputs a digital rotor position signal as the flag passes thereby. This arrangement provides single circuit construction while enabling the rotor to be parked at a point corresponding with a characteristic maximum electrical motor starting torque.

In the preferred embodiment of the present invention, the positioner serves to lock the rotor at orientations coinciding rotationally with points of characteristic maximum electrical motor torque. This arrangement has the advantage of reducing start-up logic in the control circuit, ensuring that motor has full start-up torque at the instant it is energized and provides a "parking detent" to protect the vehicle from rolling away on reasonable slopes.

In the preferred embodiment of the invention described in detail in the specification, a substantially fixed DC power source such as a battery energizes a single-phase brushless motor which, in turn, imparts torque to at least one tractive wheel of the vehicle. The motor is characterized by a stator adapted for mechanical grounding to a relatively stationary portion of the vehicle such as its body, and a permanent magnet external rotor disposed for rotation about the stator for magnetic interaction therewith and adapted to engage the tractive wheel. An inverter provides a power input from the power source and a power output to the motor in response to switch command signals generated by a control circuit in response to an operator demand signal and rotor position signal (5). Means are provided which rotate in conjunction with the rotor and define an engagement surface characterized by plurality of spaced detents. Finally, actuator means selectively engage the surface to limit rotational freedom of the rotor in cooperation with the detent. This arrangement has the advantage of providing an inexpensive and simply constructed single-phase brushless permanent magnet AC motor traction drive for electric road vehicles which ensures that the rotor will, during normal operation, come to rest or park in a position of maximum electrical torque.

These and other aspects and advantages of the present invention will become apparent upon reading the following Specification, which, along with the application drawings, describes and discloses a preferred embodiment of the invention, as well as modifications thereof, in detail.

A detailed description of the embodiment of the invention makes reference to the accompanying drawings.

BRIEF DESCRIPTION OF THE DRAWINGS

FIG. 10b, is a schematic diagram of a motor positioning circuit and a typical printed circuit board filter network forming a portion of the control circuit of FIG. 2;

FIG. 10d, is a schematic diagram of a base drive circuit forming a portion of the control circuit of FIG. 2;

FIG. 10e, is a schematic diagram of the energy recovery circuit of FIG. 2;

DETAILED DESCRIPTION OF THE PREFERRED EMBODIMENTS OF THE INVENTION

Contents

A. Electric Vehicle Drivetrain Installation
B. Inverter
C. Motor and Frame Assembly
D. Rotor Position Sensor
E. Starting
F. Pre-Start Rotor Positioner
G. Control Circuit
   (i) Forward-Reverse Signal Conditioning Circuit
   (ii) Motor Positioning Circuit
   (iii) Current Demand Logic and Minimum Starting Speed Circuit
   (iv) Base Drive Circuits
   (v) Snubber and Energy Recovery Circuits
   (vi) Switching Power Supply Circuit

A. Electric Vehicle Drivetrain Installation

Figure 1:
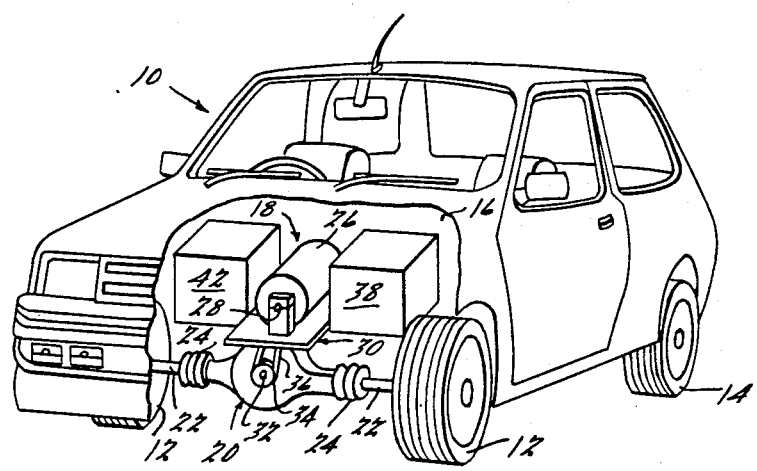
FIG. 1, is a perspective, fragmented view of an automobile incorporating the preferred embodiment of the present invention.

Referring to FIG. 1, packaging of the present invention within an electric vehicle 10 is conceptualized. Electric vehicle 10 is conventionally configured, having driven front tractive wheels 12 and free-running or slave rear wheels 14. An engine compartment, defined by area forward of a fire wall 16, contains a longitudinally mounted self-synchronous single-phase A.C. traction motor 18 which operates tractive wheels 12 through a multi-speed transaxle 20, output driveshafts 22 and interconnecting U-joints 24. As will be described in greater detail hereinbelow, motor 18 includes an external, ferrite permanent magnet rotor 26 which encloses a grounded stator (not illustrated) for rotation thereabout and magnetic interaction therewith. Rotor 26 is rotatably supported on a motor shaft 28 which is mechanically grounded at both ends thereof to a frame assembly 30. Frame assembly 30 is, in turn, mounted to a relatively stationary portion of the vehicle such as transaxle 20 or fire wall 16. Transaxle 20 includes an input shaft 32 having an axis of rotation which is maintained substantially parallel to and at a fixed distance from motor shaft 28 by frame assembly 30. Rotor 26 of motor 18 drivingly engages input shaft 32 of transaxle 20 through the provision an appropriate pulley 34 and V-belt 36.

The details of the front suspension and vehicle steering system are deleted here for the sake of brevity. The mounting of motor 18, frame assembly 30 and transaxle 20 within electric vehicle 10 is not deemed as part of the present invention and requires no further elaboration. Input shaft 32 and output drive shafts 22 are interconnected within transaxle 20 by selectable multiple ratio gear sets engageably disposed therebetween. An example of such a transmission is disclosed in U.S. Pat. No. 4,296,650 which is hereby incorporated herein by reference. Although the transaxle disclosed in the above-mentioned patent incorporates an internal rotor tranversally mounted motor, it is contemplated that it could be easily modified to accomodate the present inventive motor either in a tranverse or longitudinal orientation within electric vehicle 10. Additionally, transaxle 20 includes a mechanical differential which operates to transfer torque to both front tractive wheels 12.

A ventilated compartment 38 depends forward from fire wall 16 within the engine compartment of electric vehicle 10 and contains a D.C. power source such as a chemical battery. In the preferred embodiment of the invention, the power supply comprises a plurality of conventional lead-acid batteries 40 (see FIGS. 2 and 10e) connected to establish a 96 VDC bus voltage. A second compartment 42 depends forwardly from fire wall 16 of electric vehicle 10 and contains an inverter circuit, shown generally at 44, and a control circuit 46 (both shown in FIG. 2). Motor 18, inverter 44 and control circuit 46 are electrically interconnected by appropriately sized cables (not illustrated). Additionally, provision must be made to periodically connect electric vehicle 10 with a source of charging current such as at the operator's residence.

The present invention can be applied to applications other than passenger vehicles. FIG. 1 is intended only as an aid to the reader in conceptualizing the packaging as it would appear in a typical commuting passenger vehicle. The details of the illustrated arrangement are therefore not to be considered limiting in any sense.

B. Inverter

Figure 2:
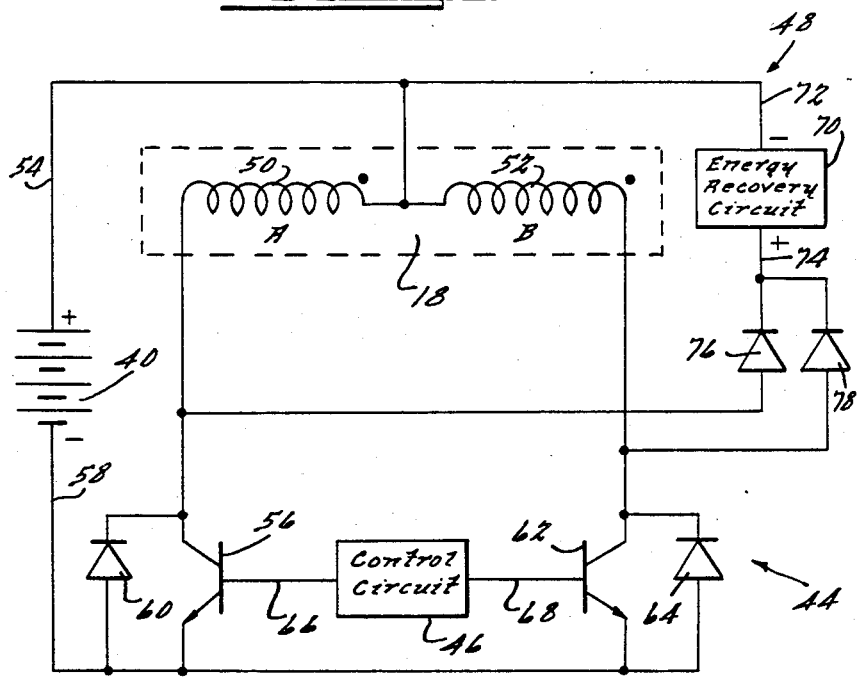
FIG. 2, is a block-schematic diagram of a traction motor, inverter and control circuit, and an implementation in the drivetrain of the automobile of FIG. 1.

Referring to FIG. 2, a simplified block diagram of the present invention is illustrated. A drivetrain, shown generally at 48 in electrical schematic form, is adapted for use with electric vehicle 10. In the preferred embodiment of the invention, the drivetrain also includes transaxle 20 and associated apparatus for applying torque to front tractive wheels 12.

Motor 18 is provided with a single phase bifilar wound, insulated multi-strand wire armature illustrated as windings A and B, 50 and 52, respectively, which minimize winding eddy current losses, establish a high coefficient of coupling and allow for the provision of a relatively straight forward inverter 44 construction. The positive terminal of battery 44 is electrically interconnected to the point of common connection of windings 50 and 52 through a positive bus 54. The remaining end of winding 50 is electrically connected to the collector of a large power transistor 56 and interconnected to a negative bus 58 from the negative terminal of battery 40 through an inverse parallel diode 60. Likewise, the remaining end of winding 52 is electrically connected to the collector of a second large power transistor 62 and interconnected to bus 58 through a second inverse parallel diode 64. The emitters of both transistors 56 and 62 are connected to bus 58. Control circuit 46 has two control lines 66 and 68 which output switch command signals to transistors 56 and 62, respectively. Inverter 44 also includes an energy recovery circuit 70 with an output line 72 electrically connected to the point of common connection between windings 50 and 52, and an input line 74 which is interconnected to the collectors of transistors 56 and 62 through auxiliary diodes 76 and 78, respectively. Control circuit 46 has additional inputs (not illustrated) as will be described hereinbelow.

Transistors 56 and 62 and diodes 60 and 64 effect the basic D.C. to A.C. power conversion of inverter 44. Diodes 76 and 78 operate to recover trapped inductive energy in motor windings 50 and 52 as will be described hereinbelow. It is contemplated that thyristors or other suitable devices could be substituted for transistors 56 and 62.

The operation of inverter 44 is as follows. Control circuit 46 generates switch command signals as a function of rotor speed, rotor rotational sense, rotor position, motor current, driver (speed) demand and selected motor rotational sense (vehicle direction). In the presence of a driver demand and direction (forward-/reverse) selection, control circuit 46 will output a switch command signal on line 66 whereby transistor 56 is initially turned on, allowing current to flow from winding 50. As can best be seen by referring to FIGS. 12h through 12k, inclusive, when motor 18 is stalled or turning very slowly, there will be no back EMF, and the entire battery voltage will appear across the winding impedance, causing motor current to increase rapidly according to characteristic L/R time constant. When a current limit set point ($\pm I_{Limit\ A}$) is reached, transistor 56 is turned off and a current is transferred by the transformer action of motor 18 to winding 52 through diode 64 back into battery 40. When the current decays or falls to a lower set point ($\pm I_{Limit\ B}$), transistor 56 is again turned on and current rises. Because the transformer action of motor 18 causes the peak voltage on transistor 56 to equal or exceed twice the battery voltage ($V_{cc}$), trapped energy in winding 50 must be returned to a voltage source of twice the supply voltage. Lines 72 and 74 are provided to define an energy recovery bus by which energy recovery circuit 70 reconstitutes nontransformed energy and returns it to battery 40, as will be described in detail hereinbelow. During the second half cycle of operation, transistor 56 is held off while transistor 62 is alternately switched on and off as the current in winding 52 fluctuates between the limit set points.

When motor 18 is operating above its base speed, a back EMF exceeding $V_{cc}$ is present and motor current is controlled by load angle only. Accordingly, during their respective duty cycles, transistors 56 and 62 will alternately remain on as can best be seen by referring to FIGS. 12d through 12g, inclusive.

C. Motor and Frame Assembly

Referring to FIGS. 3 through 6, the structural details of motor 18 and frame assembly 30 are illustrated. Frame assembly 30 comprises a rigid base plate 80 and two vertical mounts 82 and 84 extending upwardly therefrom to cradle motor 18 therebetween. Mounts 82 and 84 are secured to base plate 80 by cap screws 86 or other suitable fastening means. The uppermost ends of mounts 82 and 84 terminate an upwardly opening cylindrical recesses 88. Clamp members 92 are disposed above mounts 82 and 84 and define downwardly opening cylindrical recesses 90 which coact with recesses 88 to receive the ends of motor shaft 28 therebetween. Suitable fasteners such as cap screws 94 extend downwardly through clamp members 92 and threadably engage mounts 82 and 84 to draw clamp members 92 downwardly against motor shaft 28 and thereby mechanically ground same to frame assembly 30.

Figure 5:
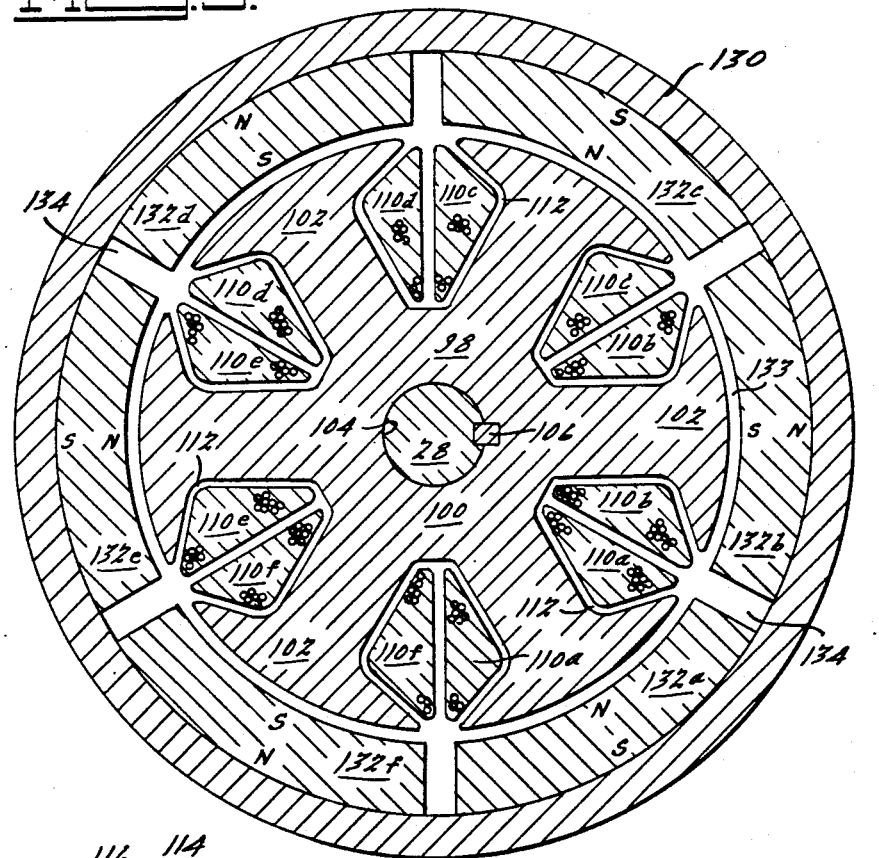
FIG. 5, is a cross-section view taken on line 5—5 of FIG. 3.

Motor shaft 28 is constructed of ferrous metal such as magnetic steel and supports a stator assembly 96 at a point intermediate mounts 82 and 84. As is best seen in FIG. 5, stator assembly 96 includes an armature member 98 defining a hub portion 100 and six circumferentially spaced radially outwardly extending protuberant armature poles or teeth 102. Motor shaft 28 extends through an axial bore 104 within hub portion 100 of armature member 98. Stator assembly 96 is secured from rotation about motor shaft 28 by an elongated square key 106 nestingly disposed within cooperating notches within shaft 28 and armature member 98. As viewed in FIG. 3, stator assembly 96 is assembled upon motor shaft 28 from the right and has its leftward displacement limited by a step 108 formed in shaft 28. Induction coils 110 are wound around each armature tooth 102 within spaces 112 provided between each pair of adjoining teeth 102. The six induction coils 110a through 110f are series connected to collectively comprise single phase windings 50 and 52 (see FIG. 2) and are bifilar-wound insulated multi-strand wire. Induction coils 110 are suitably insulated and mechanically retained by armature member 98 employing methods well known in the art. Accordingly, the entire stator assembly 96 is rigidly secured to motor shaft 28 in the position illustrated.

Figure 3:
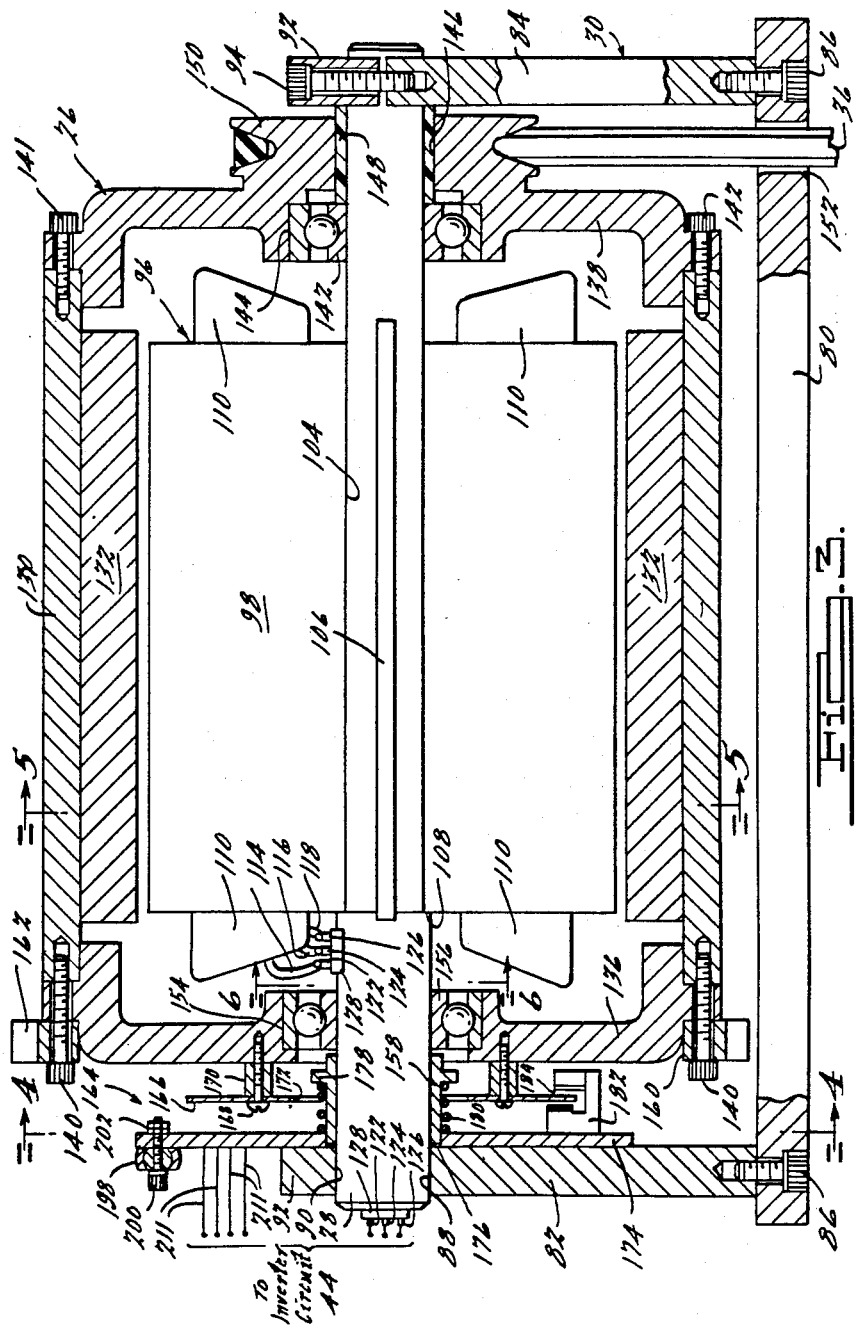
FIG. 3, is a cross-sectional view of the motor and frame assembly of FIG. 1.
Figure 6:
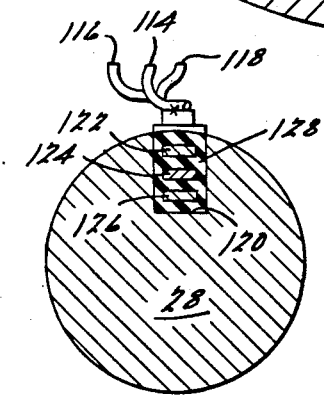
FIG. 6, is a cross-sectional view taken on line 6—6 of FIG. 3.

Referring to FIGS. 3 and 6, in the preferred embodiment of the invention, three conductive wires 114, 116 and 118 emerge from induction coils 110a through 110f, which collectively comprise windings 50 and 52. An axially extending slot 120 is formed within the portion of motor shaft 28 extending leftwardly from step 108. Three bus bars 122, 124 and 126 extend through slot 120, emerging radially outwardly from motor shaft 28 within motor 18 adjacent coils 110 and are electrically interconnected to conductors 114, 116 and 118, respectively. Bus bars 122, 124 and 126 extend leftwardly (as viewed in FIG. 3), emerging from the lefthand end of motor shaft 28, for electrical connection to inverter circuit 44. Bus bars 122, 124 and 126 are electrically insulated from one another and from motor shaft 28 by high quality insulation 128 which fills the remainder of slot 120.

Figure 6A:
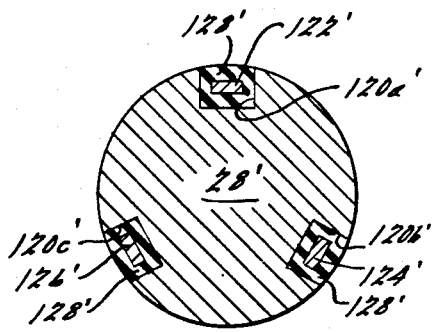
FIG. 6a, is an alternative embodiment of the shaft bus conductor arrangement of FIG. 6.

Referring to FIG. 6a, an alternative construction of conductor routing out of motor 18 is illustrated. An alternative motor shaft 28' has three circumferentially spaced axially extending slots 120a', 120', 120c' formed therein. Bus bars 122', 124' and 126' are disposed within slots 120' and are electrically connected within inverter circuit 44 as in the case of the preferred embodiment of the invention. Bus bars 122', 124' and 126' are electrically insulated from motor shaft 28 by high quality insulation 128'.

Rotor 26 of motor 18 includes a soft steel cylindrical shell 120 which carries six arcuate ferrite permanent magnet segments 132 circumferentially spaced about the radially innermost surface thereof. Magnet segments 132a through 132f are affixed to the inner surface of shell 130 by adhesives or other suitable material.

Shell 130 serves as the machine flux return path as well as to protect magnets 132 and to absorb hoop stresses during operation. The radially innermost surface of magnet segments 132 are closely spaced radially outwardly from the outwardmost face defined by armature teeth 102 by a gap 133 and are substantially circumferentially coexstentive therewith. Magnet segments 132 are radially polarized in a sense opposite to that of adjoining magnet segments 132. Thus, shell 130 and magnet segments 132 rotate about stator assembly 96 in close proximity thereto. Adjoining magnet segments 132 have a circumferential space 134 disposed therebetween. Although being illustrated as constructed of solid ferrous material, both armature member 98 and shell 130 should be constructed of laminations when motor efficiency is an important consideration, as is well known in the art. With lamination construction, axially extending through-bolts would most likely be required and would be positioned within spaces 134. Additionally, it is contemplated that the magnet segments 132 would be magnetized in situ with shell 130, although other manufacturing methods could be substituted.

The radial spacing of rotor 26 is maintained by aluminum end bells 136 and 138. End bell 136 closes the lefthand end of shell 130 and is secured thereto about its outer circumference by suitable fastening means such as cap screws 140. Likewise, the outer circumferential portion of end bell 138 is affixed to the righthand opening of shell 130 by cap screws 141.

Although V-belt 36 and conventional pulley designs 34 and 150 were employed by the applicant and disclosed in the preferred embodiment of the invention, it is contemplated that larger applications may dictate the use of chains, cogged belts, direct gearing or the like. Accordingly, the V-belt 36 arrangement is only intended to be illustrative in nature and not to be considered limiting.

A ball bearing assembly 142 has the inner race thereof press fit on the righthand end of motor shaft 28. The radially innermost surface of end bell 138 defines an axially aligned stepped bore having a first portion 144 press fit over the outer race of ball bearing 142 and second portion 146 circumscribing the outer surface of a black delrin sleeve bearing or bushing 148 press fit upon motor shaft 28 intermediate ball bearing 142 and mount 84. End bell 138 has a pulley 150 intregrally formed therein which coacts with pulley 34 of transaxle 20 to carry V-belt 36. A suitable passageway 152 is provided through base plate 80 for routing V-belt 36.

End bell 136 also has an axially aligned stepped bore having a first portion 154 press fit over the outer race of a second ball bearing 156. The inner race of ball bearing 156 is press fit over motor shaft 28 near the lefthand end thereof.

Thus, rotor 26 is carried on motor shaft 28 in the orientation shown and is free to rotate thereabout, supported by ball bearings 142 and 156. Bushing 148 is provided to counter radial loading imposed by V-belt 36. In addition, bushing 148 provides axial spacing between ball bearing 142 and mount 84. Likewise, a tubular sleeve 158, carried by motor shaft 28, interspaces ball bearing 156 and mount 82.

Motor 18 of the present invention has a number of significant advantages over the prior art when applied in a drive train of a traction vehicle. Ferrite magnets were employed because the flux density of ferrite is on the order of three to four kilogauss, considerably lower than the ten to twelve kilogauss which can be sustained by iron before it begins to saturate. The geometrical configuration of motor 18 uses the flux at the inside surface of the magnet segments 132 to produce torque. This results in an air gap 133 flux density at the inner radius of the magnet segments 132 which is higher than that at the outside surface, resulting in a greater torque per amp of armature current. In addition, the armature pole pieces or teeth 102 can be designed to utilize the full flux carrying capability of the iron. The relatively thin flux paths from pole to pole concentrate the air gap flux of 3.4 kilogauss to better than 10 kilogauss at the base of the armature teeth 102. A minimum of iron may be used, reducing motor weight and/or providing more room for the windings than would a nonsalient pole machine. This also results in a smaller motor outer diameter for given motor air gap dimensions. The salient pole structure has a particular advantage in a single-phase machine in providing a larger winding area which typical polyphase machines do not have. The use of a concentrated armature winding using a conventional rotor with soft iron is normally unacceptable, but when ferrite permanent magnets are used, there is no pulsation or eddy loss in the magnet. The advantages of the concentrated winding are significant in the present application, giving greatly reduced copper content, reduced mean length of turn and hence a much higher electrical efficiency for a given $D^2L$ machine rating. The proposed geometrical configuration of motor 18 provides armature iron which operates at a high flux density for reduced weight and less machine length per turn of winding. Finally, the external rotor configuration permits magnet segments 132 to be retained by a simple epoxy bond.

The mechanical structure of motor 18 does have some disadvantages, however. A primary concern is cooling. The heat-generating winding (coils 110) is in the center of motor 18, relatively well insulated by the ceramic magnets 132. Special attention must be paid to the thermal design of this motor. Although no provision for cooling has been disclosed herein, it is contemplated that any number of cooling methods can be implemented. For example, end bells 136 and 138 could be provided with openings for natural cooling. In larger applications, forced air cooling may be required, necessitating an impeller or other suitable arrangement to pass air inside of rotor 26. Cooling air passages through armature member 98 could be employed as is known in the art. The present invention could also be easily modified to accomodate liquid cooling by virtue of the provision of a relatively large shaft for the routing of electrical power as discussed hereinabove in the description relating to FIGS. 6 and 6a. Specifically, cooling lines could also pass through axial bores within shaft 28 for the circulation of a cooling fluid within stator assembly 96. Such cooling tubes could pass through bores provided within armature member 98 or through spaces 112 provided between armature teeth 102. Overall, the sizing of motor 18 for its intended application will be determinative of requisite cooling. It is to be understood that any specific dimensions, flux densities and the like, specified herein are derived from a reduced scale version of the present invention developed by the applicant, and thus are not intended as limiting in any matter.

A further disadvantage of the configuration of motor 18 envisioned by the applicant is its high inertia, which is approximately two times that of an equivalent D.C. motor. Additionally, relatively large bearings 156 are required at at least one end of the machine and, as discussed hereinabove, potential zero starting torque can be encountered at certain rotor positions. These disadvantages, however, have either been mitigated by reduced motor size, simplified construction and improved efficiency, or overcome by the provision of additional features as will become apparent upon reading the present specification.

An annular cam ring 160 is rigidly mounted to the outer circumferential portion of end bell 136 by screws 140 and defines a cam surface 162 on the outer circumference thereof. For reasons which will be described in detail hereinbelow, cam ring 160 is carried by rotor 26 for rotation therewith with respect to stator assembly 96 and frame assembly 30.

D. Rotor Position Sensor

Figure 4:
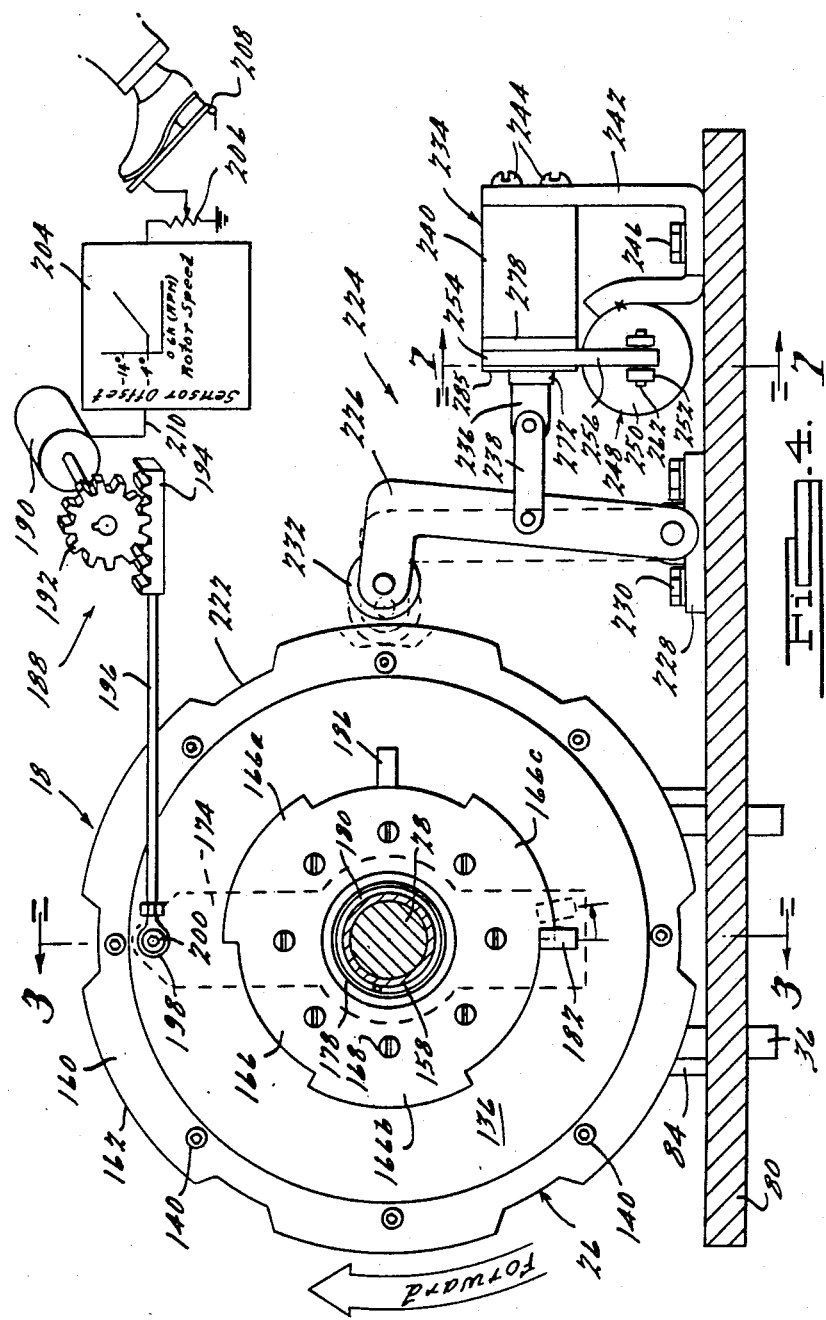
FIG. 4, is a cross-sectional view taken on line 4—4 of FIG. 3, and further illustrating a rotor position sensing arrangement and a mechanical rotor locking mechanism.

A rotor position sensing assembly and mechanical dwell mechanism is illustrated in FIGS. 3 and 4 generally at 164. Assembly 164 includes an encoded washer shaped mild steel vane 166 mounted to the lefthandmost surface of end bell 136 by screws 168 which pass through an annular aluminum vane spacer 170 and threadably engage end bell 136. Vane 166 has a central opening 172 for providing radial spacing from sleeve 158. Vane 166 and vane spacer 170 rotate with rotor 26. The circumferential profile of vane 166 can best be seen in FIG. 4. An elongated sensor carrier 174 is disposed intermediate mount 82 and vane 166. The lefthandmost end of sleeve 158 extends through a central aperture 176 within carrier 174 and provides radial support thereto. An outwardly extending circumferential flange 178 is integrally formed near the righthandmost end of sleeve 158. A compression loaded spring 180 has one end thereof bearing against the lefthandmost surface of flange 178 and the other end thereof bearing against the righthandmost surface of sensor carrier 174. The lefthandmost surface of carrier 174 bears against the righthandmost surface of mount 82. Thus, spring 180 will bias carrier 174 leftwardly for retention in its illustrated position. Carrier 174 is free to rotate about the axis defined by motor shaft 28 but is otherwise restrained from axial or radial displacement from its illustrated position.

A vane actuated sensor or switch 182 is affixed to sensor carrier 174 and includes sensing elements which straddle vane 166 near the outer circumference thereof. In the preferred embodiment of the present invention, the applicant employed hall effect sensors which function to detect the presence of an object within the sensing region 184 thereof. Vane 166 has three circumferentially spaced surface portions 166a, 166b and 166c which project outwardly far enough to pass through sensing region 184 of sensor 182 during rotation of rotor 26. As the leading or trailing edge of portions 166a, 166b and 166c pass through sensing region 184, the electrical output of sensor 182 will transistion low and high, respectively. Vane portions 166a, 166b and 166c each extend through a 60° arc and are spaced from adjoining portions by a relieved portion of vane 166 which does not pass through sensing region 184. Vane portions 166a, 166b and 166c are in precise rotational alignment with magnet segments 132c, 132a and 132e.

By virtue of its being carried by sensor carrier 174, sensor 182 is angularly selectably repositonable with respect to both rotor 26 and stator assembly 96. A second vane actuated sensor or switch 186 is provided with its sensing region (not illustrated) in register with vane 166 and is nominally offset angularly from sensor 182 by 90°. Sensor 186 is carried by mount 182 and is fixed with respect to stator assembly 96.

In operation, the actual angular orientation of switch 182 is established by a sensor positioner shown generally at 188. Positioner 188 includes an actuator such as a stepper motor 190 driving a pinion 192 which is engaged with a rack 194. A connecting link 196 interconnectes rack 194 and sensor carrier 174. Link 196 is affixed to carrier 174 at a point distal motor shaft 28 to effect a mechanical advantage. Link 196 terminates in a ball joint 198 which is connected to carrier 174 by suitable fastening means such as a machine screw 200 and nut 202. A control circuit 204, including a rotor speed sensor 206 associated with a throttle 208 or other control associated with electric vehicle 10, operates to generate a control signal which is impressed on a line 210 to energize stepper motor 190 and to thereby selectively linearly position rack 194. This, in turn, will angularly reposition sensor 182 in the offset vs. rotor speed relationship indicated. The amount of offset is in relation to true vertical, assuming a clockwise rotation of rotor 26 corresponds with driving electric vehicle 10 in the forward direction. The range of offset as well as the break point in the curve are givin by way of example only, being derived from the applicant's initial experimentation. However, it is contemplated that larger applications would result in a different offset range and base speed (in this case 6k RPM). Accordingly, those specifics are not to be deemed as limiting. The angular repositioning of sensor 182 will effect a shift in dwell or phase of the applied motor voltage characteristic as can best be seen in FIG. 12c.

Referring to FIG. 3, electrical leads, shown generally at 211 are routed from sensors 182 and 186 to inverter circuit 44 in the version of the present invention wherein mechanical or manual repositioning of sensor 182 is accomplished.

Figure 9:
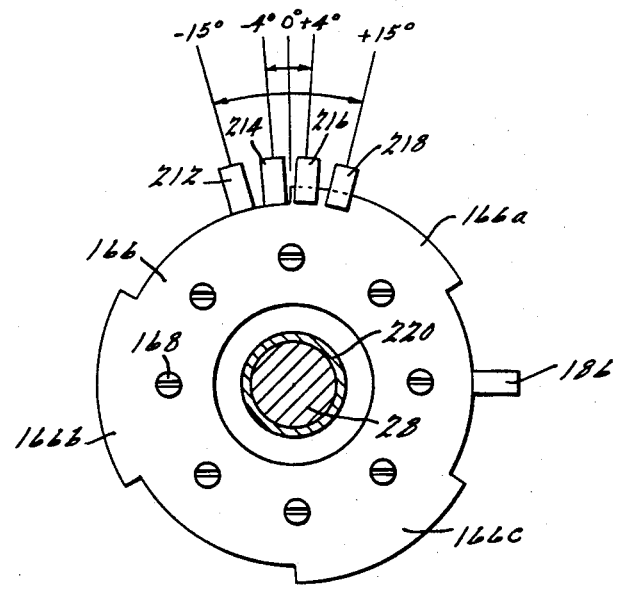
FIG. 9, is a cross-sectional view of an alternative embodiment of the rotor position sensing arrangement of FIG. 4.

Referring to FIG. 9, an alternative to sensor positioner 188 is illustrated which is designated as electronic leading sensor control. In this version, four type AV12A hall sensors 212, 214, 216 and 218 are provided in a fixed angular relationship and radially spaced from motor shaft 28 so that only portions 166a, 166b and 166c of vane 166 pass through the sensing regions thereof. Sensors 212, 214, 216 and 218, as well as sensor 186, are rigidly carried by mount 82. Sensor carrier 174, sleeve 158 and spring 180 are eliminated and a flangeless sleeve 220 is provided to interspace the inner race of ball bearing 156 and the righthandmost surface of mount 82. Control circuit 46 will be described in detail hereinbelow employing the electronically controlled applied voltage leading angle version of FIG. 9. However, it is contemplated that mechanical sensor positioner 188 illustrated in FIG. 4 could alternatively be employed as will become apparent upon further reading of the present specification.

E. Starting

As a single-phase machine, permanent magnet traction motor 18 shares a characteristic of all single-phase A.C. motors in that no starting torque may be available, depending upon at rest rotor position vis-à-vis stator pole position. However, the motor 18 employed in the present application is better than induction or reluctance type single-phase motors in two important respects. First, it is not possible for motor 18 to run other than in the desired direction. This is insured by the angular position of sensors 212, 214, 216, 218 and 186 (or, alternatively, sensors 182 and 186) which determine current polarity as a function of position. Additionally, starting torque is available over most of the possible rotor positions. Starting torque will be unavailable in an ideal motor only when the salient armature poles or teeth 102 line up with rotor magnet segments 132. This, however, is a the position to which the unexcited reluctance torque of the machine will return the rotor 26 if no restraining force is applied. In a small practically constructed machine, small asymmetries will normally allow a small starting torque, even in these reluctance torque detent positions. This is best appreciated by referring to FIG. 12a. An actual motor 18, which is inherently imperfectly constructed, will slightly shift the zero reluctance torque point from the zero electrical torque point. This results in an asymetry with respect to the zero torque line. The applicant has surmised that this asymetry is probably the predominent reason that motor 18 will start most of the time on its own when it is in the nominal zero torque position. However, because of the intended application of the present invention in a passenger vehicle, it is imperative that 100% starting reliability be achieved.

Figure 12:
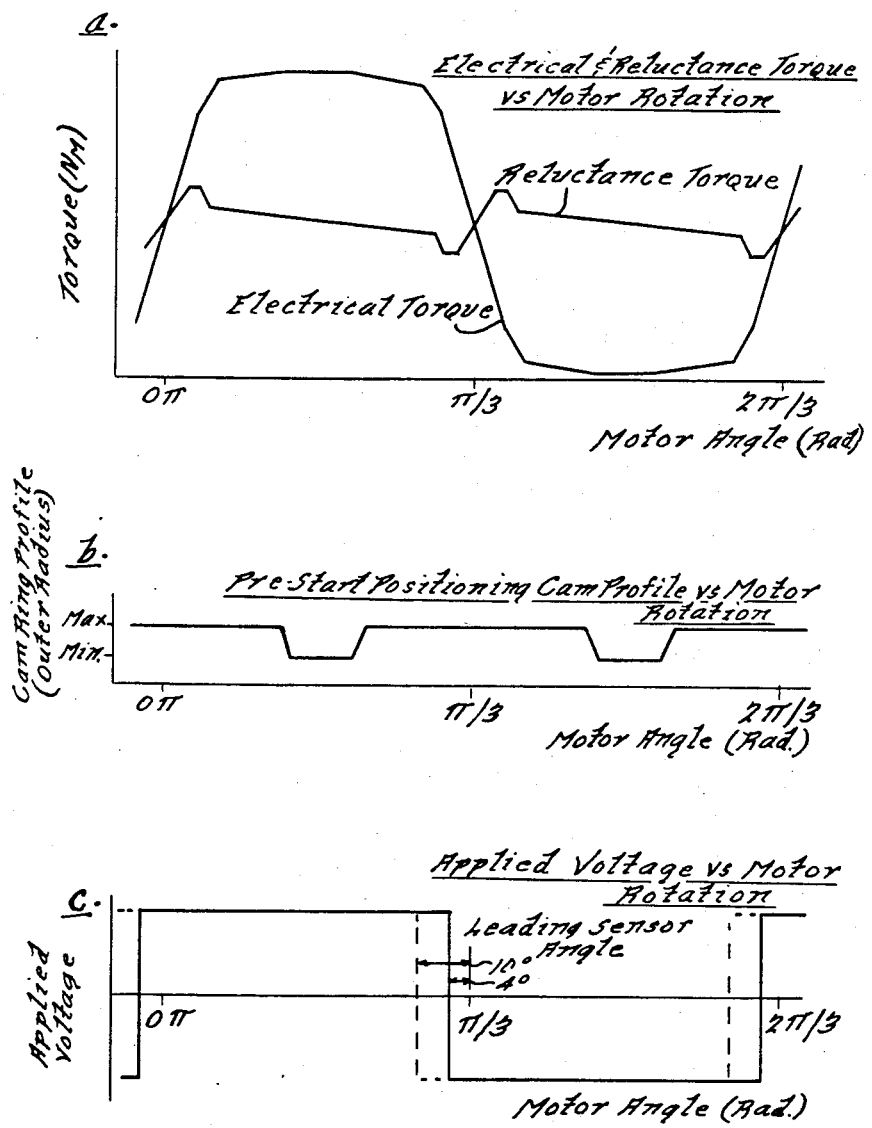
FIG. 12a, is a graph of the electrical and reluctance torque versus motor rotation characteristic of the motor of FIG. 2.
FIG. 12b, is a graph of the pre-start positioning cam profile versus motor rotation characteristic of the motor of FIG. 2.
FIG. 12c, is a graph of an applied voltage versus motor rotation characteristic of the motor of FIG. 2, illustrating the shift effected by adjustment of a leading sensor angle.
FIG. 12d, is a graph of the motor torque/EMF versus motor rotation characteristic of the motor of FIG. 2, above base speed.
FIG. 12e, is a graph of the applied voltage on motor winding A versus motor position characteristic of the motor of FIG. 2, above base speed.
FIG. 12f, is a graph of the applied voltage on motor winding B versus motor position characteristic of the motor of FIG. 2, above base speed.
FIG. 12g, is a graph of a typical motor current versus motor rotation characteristic of the motor of FIG. 2, above base speed.
FIG. 12h, is a graph of the motor torque/EMF versus motor rotation characteristic of the motor of FIG. 2, below base speed.
FIG. 12i, is a graph of the applied voltage on motor winding A versus motor position characteristic of the motor of FIG. 2, below base speed.
FIG. 12j, is a graph of the applied voltage on motor winding B versus motor position characteristic of the motor of FIG. 2, below base speed.
FIG. 12k, is a graph of a typical motor current versus motor rotation characteristic of the motor of FIG. 2, below base speed.
Figure 12:
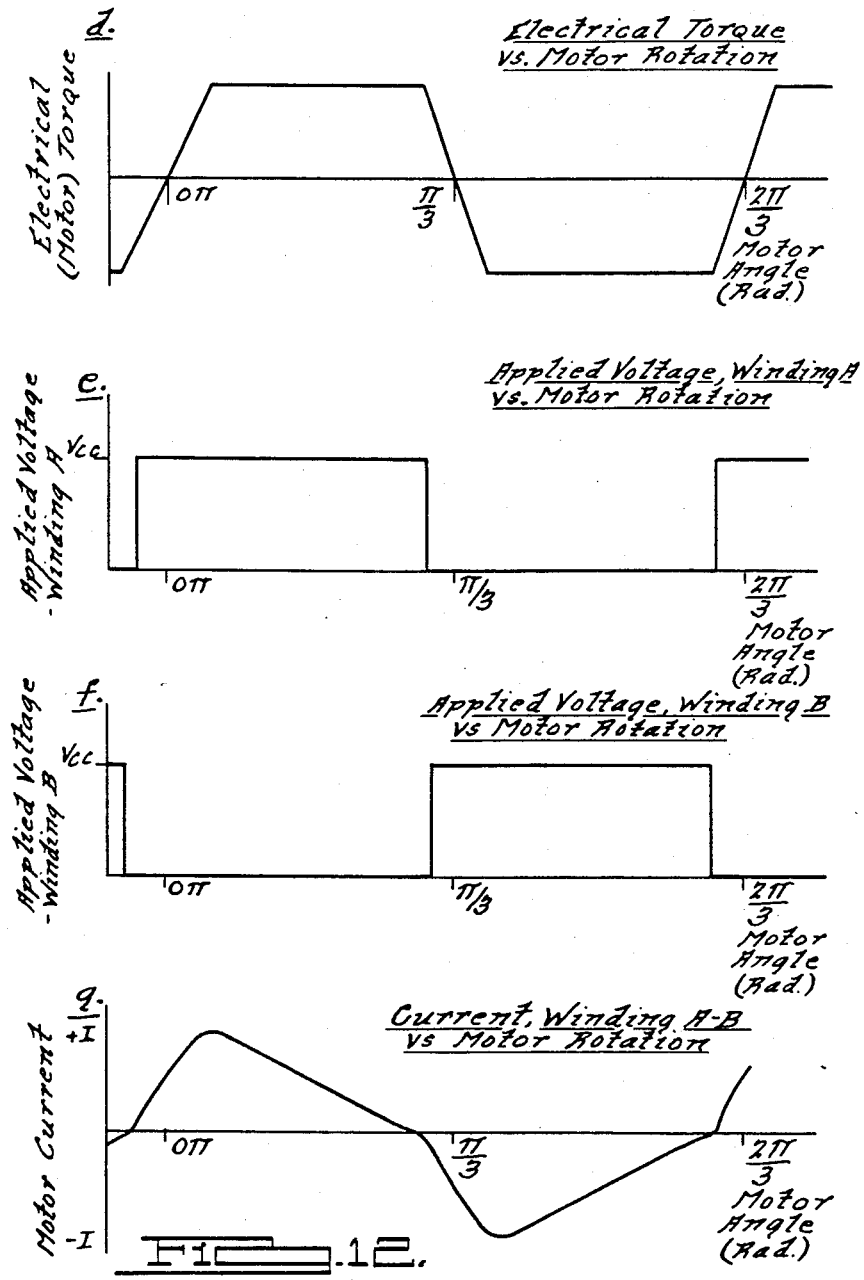
Figure 12:
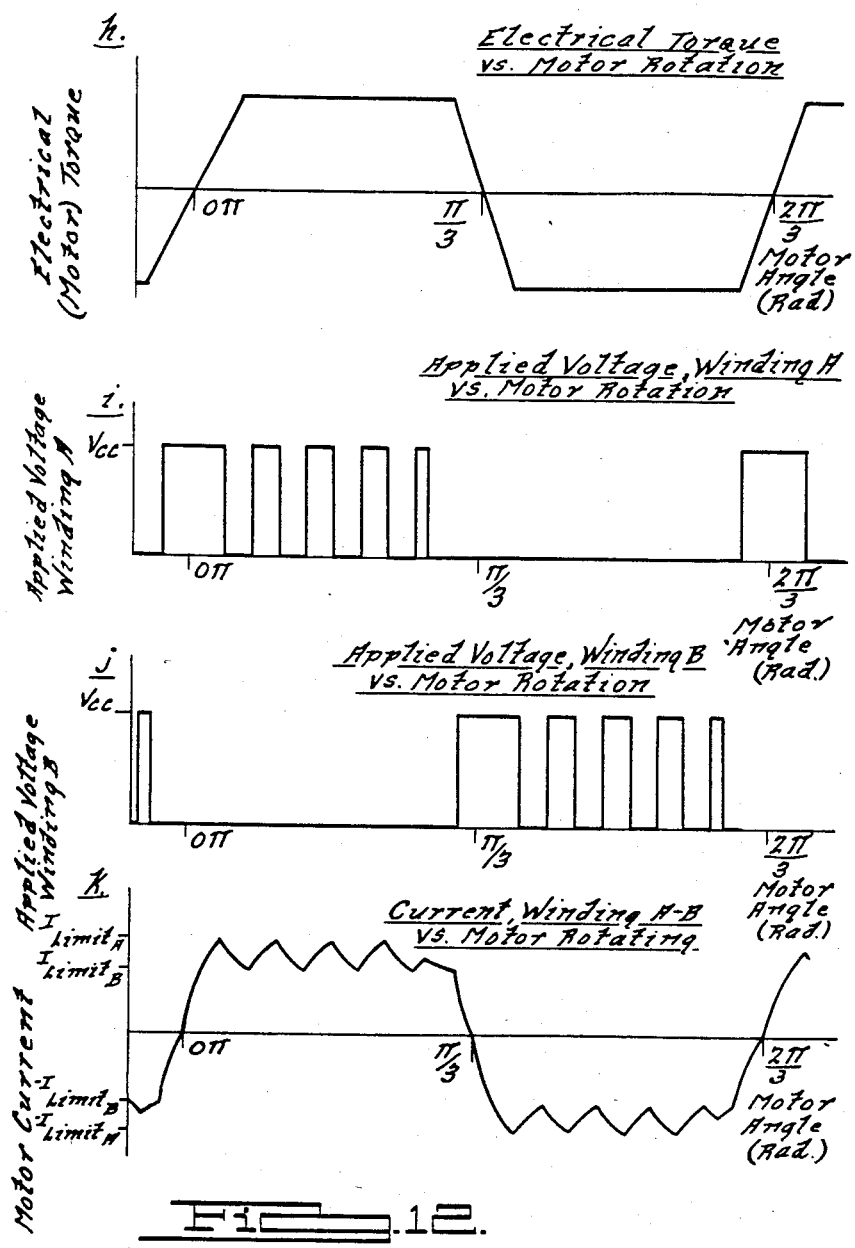

From the torque-angle curves of FIG. 12a, it is self-evident that motor 18 will tend to stop in one of six "detent" positions. These positions correspond to a position where armature teeth 102 are in line with rotor magnet segments 132. The plus and minus 4° and 15° angular offsets of sensors 212, 214, 216 and 218 were selected so that in a case where rotor 26 came to rest at 2°-3° to the left of the zero electrical torque point (refer to FIG. 12a) starting can be effected by electrically driving rotor 26 backwards to a higher electrical torque point and then reversing direction to gain momentum of rotor 26 to shoot past this zero torque point. In the angular offset selected in the present invention, rotor 26 would rotate through negative 15° revolution and then experience a current reversal that would cause motor 18 to slow and start rotating forward past minus 4°, where the motor would begin normal current switching. Typical driveline backlash will assist this type of operation.

Referring to FIG. 12a, it is apparent that a 20° range exists where the motor can be stopped and have a maximum starting torque when energized. Cam ring 160 defines six parking detents 222 on cam surface 162 spaced circumferentially 60° apart. These detents are presented in a linear graph at FIG. 12b to illustrate that they are angularly positioned to correspond with the point of maximum electrical torque of motor 18.

F. Pre-Start Rotor Positioner

Figure 7:
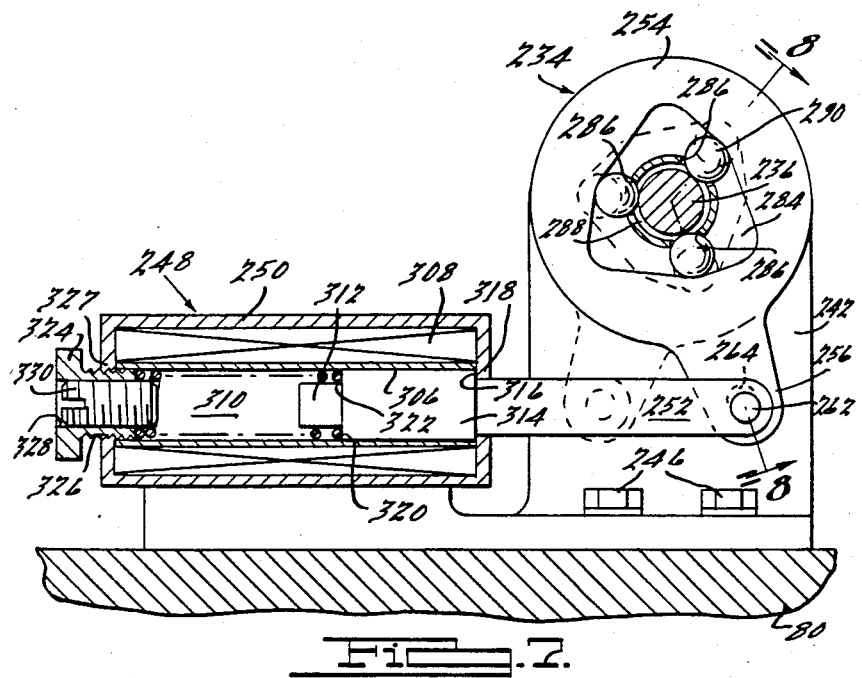
FIG. 7, is a cross-sectional view taken on line 7—7 of FIG. 4.
Figure 8:
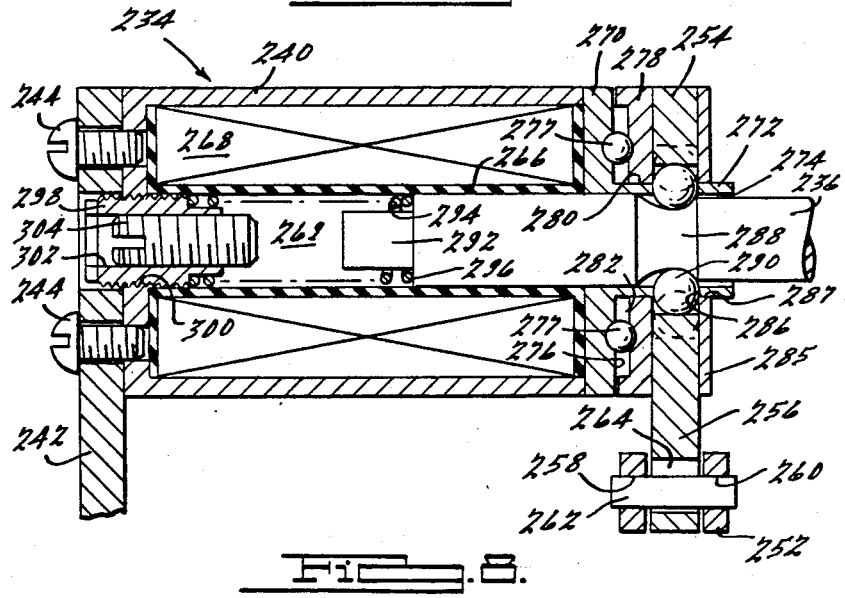
FIG. 8, is a cross-sectional view taken on line 8—8 of FIG. 7.

Referring to FIGS. 4, 7 and 8, a pre-start rotor positioner 224 is illustrated. Positioner 224 is provided to overcome zero starting torque problems and the necessity of rocking or toggling motor 18 each time a startup is required. Positioner 224 operates to mechanically lock rotor 26 in a position for maximum electrical (starting) torque, each time it coasts to a stop as will be described in detail hereinbelow.

Positioner 224 includes any elongated pawl arm 226 moveably disposed within the general plane defined by cam ring 160. The lower end of arm 226 is pivotly mounted to a base member 228 which, in turn, is secured to base plate 80 by bolts 230 or other suitable fastners. So arranged, the upper end of pawl arm 226 is pivotly displaceable into and out of engagement with the cam surface 162 of cam ring 160. The upper end of pawl arm 226 carries a roller 232 positioned adjacent cam ring 160. A solenoid 234 has a reciprocating armature 236 mechanically interconnected to pawl arm 226 by a rigid link 238 at a point intermediate base member 228 and roller 232. Armature 236 is displaceable between a fully retracted position, illustrated in solid line (FIG. 4), wherein roller 232 is clear of cam ring 160, and a fully extended position in which roller 232 is disposed within one of the parking detents 222. Solenoid 234 includes a housing member 240 which carries armature 236 and is rigidly affixed to mounting plate 80 by a bracket 242. Suitable hardware such as screws 244 and bolts 246 are employed to secure housing 240 of solenoid 234 to bracket 242 and bracket 242 to base plate 80, respectively.

A second, latch solenoid 248 has a housing 250 attached to bracket 242 such as by welding and carries an armature 252 linearly displaceable along a line normal to that of armature 236 of solenoid 234. Solenoid 234 includes a rotary latch member 254 which is angularly repositionable about the axis of armature 236. Rotary latch member 254 has a localized extension portion 256 extending radially outwardly therefrom. The end of armature 252 distal housing 250 is bifurcated, having registering axially aligned bores 258 and 260 therein. A link pin 262 is press fit through bores 258 and 260 while loosely passing through an intermediate aperture 264 within extension portion 256 of rotary latch member 254. Aperture 264 is elongated in line with the axis of rotation of latch member 254 to permit free relative rotation between extension portion 256 and armature 252 as armature 252 reciprocates between its fully extended position (illustrated in solid line in FIG. 7) and its fully retracted position (illustrated in phantom).

Housing 240 of solenoid 234 is generally cup-shaped, having an annular insulating bobbin 266 and coil 268 therein. Bobbin 266 defines a central bore 269 for slideably receiving armature 236. The opened end (right-hand as viewed in FIG. 8) is enclosed by a closure member 270. Both housing 240 and closure member 270 are constructed of ferrous metal and are joined by welding or other suitable process. Closure member 270 includes a rightwardly extending tubular extension 272 integrally depending therefrom. Extension 272 defines a bore 274 coaxially aligned with bore 269. Closure member 270 also defines a thrust surface 276 having an axially aligned annular groove therein circumscribing tubular portion 272 for receiving a plurality of ball bearings 277 therein. A washer-shaped thrust member 278 forms an annular passageway 280 which loosely receives tubular portion 272 therethrough. The lefthand surface of thrust member 278 defines a second thrust surface 282 having a second annular groove circumscribing tubular portion 272 to receive a portion of ball bearings 277 therein. Thus, closure member 270, ball bearings 277 and thrust member 278 function as a bearing wherein thrust member 278 is able to withstand considerable leftwardly directed axial loading while simultaneously being relatively easily rotationally repositionable with respect to closure member 270. Rotary latch member 254 has a generally triangular shaped aperture 284, through which extends tubular portion 272. The lefthandmost surface of rotary latch member 254 abuts the righthandmost surface of thrust member 278, and the two are joined such as by welding or other suitable process. Three circumferentially spaced radially directed apertures 286 are formed in tubular portion 272 at a point whereby they entirely open into aperture 284 of latch member 254. Armature 236 has an annular recess 288 with a semicircular cross-section therein. Recess 288 is positioned axially along armature 236 so as to register with apertures 286 and 284 when armature 236 is in its extended position. Tubular portion 272 serves as a cage for three locking balls 290 nominally disposed within apertures 286. Balls 290 extend outwardly into aperture 284 of latch member 254 (in phantom) when armature 252 is fully retracted. At that time, recess 288 is displaced axially from balls 290 which freely ride on the outer surface thereof. When armature 236 is in its extended position so that recess 288 aligns with latch member 254, and latch member 254 is rotated counterclockwise where armature 252 of solenoid 250 is fully extended, the surfaces of latch member 254 defining aperture 284 will cam or urge balls 290 inwardly, through apertures 286 and partially into recess 288, in an abutting relationship with armature 236. In this position, armature 236 is locked in its illustrated axial position. Also, roller 232 will be located within one of the parking detents 222 of cam ring 160 thereby locking rotor 26.

A washer shaped backing plate 285 as a central bore 287, through which extends tubular portion 272. The lefthandmost surface of backing plate 285 abuts the righthandmost surface of latch member 254. Backing plate 285 is welded or suitably permanently affixed to tubular portion 272 about the interface therebetween to retain ball bearings 277, thrust member 278 and rotary latch member 254 in their illustrated positions.

The lefthandmost end armature 236 has an area of reduced diameter 292. A spring 294 residing in bore 269 bears rightwardly against a step 296 defining the transition between area of reduced diameter 292 and the remainder of armature 236, and leftwardly against a spring tension spanner adjustment screw 298 which is threadably received within an aperture 300 within housing 240 axially aligned with bore 269. Spring 294 biases armature 236 in the rightward direction, and advancing screw 298 leftwardly or rightwardly provides selective adjustment of the biasing force. Adjustment screw 298 has an axially aligned bore 302 therethrough within which is threadably received an armature stop limit screw 304.

Armature 236 is constructed of ferrous metal. Thus, when coil 268 is energized electrically, a magnetic circuit is established therein of a sense or polarity which draws armature 236 from its extended position to its retracted position. In its retracted position the lefthandmost surface of area of reduced diameter 292 of armature 236 will abut the righthandmost surface of limit screw 304. Screws 298 and 304 are arranged as they are to provide for independent adjustment of spring 294 biasing and armature 236 stop limit. Solenoid 234 requires no armature 236 stop in the extended position inasmuch as the abuttment of roller 232 against cam ring 160 will provide that function.

Solenoid 248 has construction similar to that of solenoid 234 wherein housing 250 is generally cylindrical and closed at the ends to trap an insulating coil bobbin 306 and a coil 308. Bobbin 306 defines a bore 310 for loosely receiving armature 252 therein. Armature 252 is constructed of ferrous material and defines an area of reduced diameter 312 at the lefthandmost end thereof and an area of increased diameter 314 and in an intermediate portion therealong. A step 316 is formed at the point of transition between area of increased diameter 314 and the remainder of armature 252 which abuts an end portion 318 of housing 250 when armature 252 is extended to define its righthandmost limit of travel. A compression loaded spring 320 residing in bore 310 bears rightwardly against a step 322 formed at the point of transition between area of reduced diameter 312 and area of increased diameter 314 of armature 252. Spring 320 bears leftwardly against the righthandmost surface of a spring tension adjustment screw 324 threadably engaged within an aperture 326 within an end portion 327 of housing 250, in axial alignment with bore 310. Thus, spring 320 tends to bias armature 252 rightwardly into its extended position (illustrated). Adjustment screw 324 has an aperture 328 therethrough within which is threadably received an armature stop limit screw 330. Screws 324 and 330 are independently adjustable, screw 324 for selectively adjusting the tension in spring 320 and screw 330 for setting the lefthandmost or retracted stop limit of armature 252. When coil 308 is energized electrically, a magnetic circuit is established and armature 252 is drawn rightwardly until it abuts screw 330. When the energization is terminated, spring 320 will again displace armature 252 into its extended position.

Solenoids 234 and 248 are illustrated with their internal details in substantially simplified form. It is to be understood that they do not represent optimized designs and are only intended to demonstrate the overall operation of pre-start rotor positioner 224. Any number of commercially available linear actuators or solenoids could be substituted without departing from the spirit of the present invention.

Pre-start rotor positioner 224 operates as follows. When motor 18 is in its normal stopped condition, roller 232 will reside within one of the parking detents 222. Armature 236 is in its extended position as illustrated in FIG. 8. Roller 232 will bear against surface 162 of cam ring 160 with a force supplied by biasing spring 294 of solenoid 234 through armature 236, link 238, arm 226 and roller 232. Solenoid 248 will simultaneously have its armature 252 in its extended position in which latch member 254 has urged balls 290 into recess 288 to lock armature 236 in its illustrated position. If motor 18 were inadvertently energized or torque was applied thereto through transaxle 20, rotor 26 would be prevented from rotation. When motor 18 is normally energized, coils 269 and 308 of solenoids 234 and 248, respectively, are simultaneously energized. When that happens, coil 308 will displace armature 252 to its retracted position, whereby locking balls 290 are displaced radially outwardly releasing armature 236, which itself, is being drawn towards its retracted position by the action of coil 268. When armature 236 assumes its retracted position, it draws pawl arm 226 and link 238 therewith, spacing roller 232 from cam ring 160. When electric vehicle 10 is coming to a stop and the speed of rotor 26 falls below a certain threshold, both coils 268 and 308 are deenergized. At that time, spring 294 will bias armature 236 so that roller 232 will abut whatever portion of cam ring 160 happens to be adjacent thereto. As soon as the first parking detent 222 is reached, armature 236 will achieve its full extended position, balls 290 will fall into recess 288 at the urging to latch member 254 which is rotated counterclockwise (in FIG. 7) by spring 320. If, during operation, either coil 268 or 308 should fail, the remaining solenoid will act to hold roller 232 away from cam ring 160 until the normal solenoid deenergization sequence begins. Once motor 18 is locked, a subsequent attempt to energize motor 18 will result in a failure to start, thereby alerting the operator to the problem.

G. Control Circuit

Figure 11:
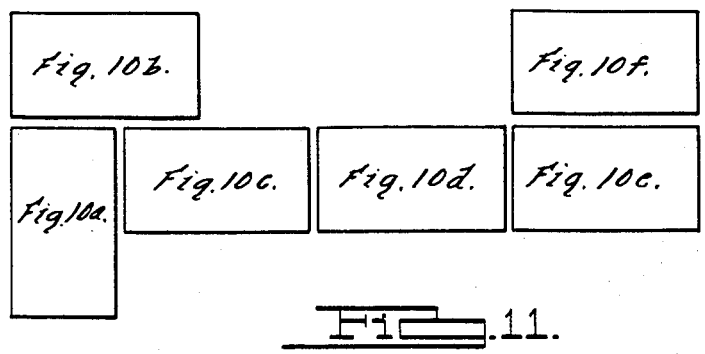
FIG. 11, is a drawing figure key, illustrating the proper arrangement of FIGS. 10a through 10f.

Referring to FIG. 11, a key to the arrangement of the pages of drawings containing FIGS. 10a through 10f, inclusive, is given. FIGS. 10a through 10f define the complete electrical circuit of drivetrain 48 including inverter circuit 44, control circuit 46, battery 40 and motor 18.

Motor 18 has a cross-section (see FIG. 5) having structure similar to that of a conventional D.C. permanent magnet motor. In addition to the external permanent magnet rotor 26, the major differences are electrical in that the motor is electronically driven and the armature current is electronically communtated within the stator assembly 96 while the field rotates. Furthermore, the electronic commutation is effected by events controlled by sensors.

As outlined in the discussion of operation of inverter 44 hereinabove, control circuit 46 functions to sense certain operating parameters and to generate switch command signals on lines 66 and 68 as a function thereof to reciprocally energize windings 50 and 52, and thus motor 18, by alternately switching transistors 56 and 62 between conductive and nonconductive states. The switch command signals are characterized as being pulse width modulated when motor 18 is below its base speed, as best viewed in FIGS. 12i and 12j. The measured input parameters to control circuit 46 are rotor speed, rotor rotational sense, rotor position, driver speed demand and driver directional demand. Rotor speed, rotor rotational sense and rotor position are deduced by control circuit 46 from the cumulative inputs of sensors 186, 212, 214, 216 and 218 (or, alternatively, sensors 182 and 186). Motor current is measured directly, as are the driver inputs. Because motor 18 is single-phase bifilar wound, system operation is self-synchronous and relatively straight forward as will be described in detail hereinbelow.

Control circuit 46 also functions to "park" rotor 26 when required, by toggling motor current to dither rotor 26 about one of its parking positions where one of the detents 222 of cam ring 160 are aligned with roller 232. A timer continues the current toggling for a predetermined period of time, during which, the pre-start rotor positioner 224 engages cam ring 160. This ensures the availability of a maximum electrical starting torque the next time motor 18 is energized. In the event rotor 26 is stopped in other than a part position, or, the driver does not apply enough throttle to overcome the cogging effect of the first attracting magnet segment 132 encountered by a stator pole 102, control circuit 46 provides a "blast-off" feature which overrides the throttle and applies a preestablished minimum torque demand signal. Finally, provision is made for the recovery of energy from snubber circuits associated with transistors 56 an 62.

(i) Forward-Reverse Signal Conditioning Circuit

Figure 10A:
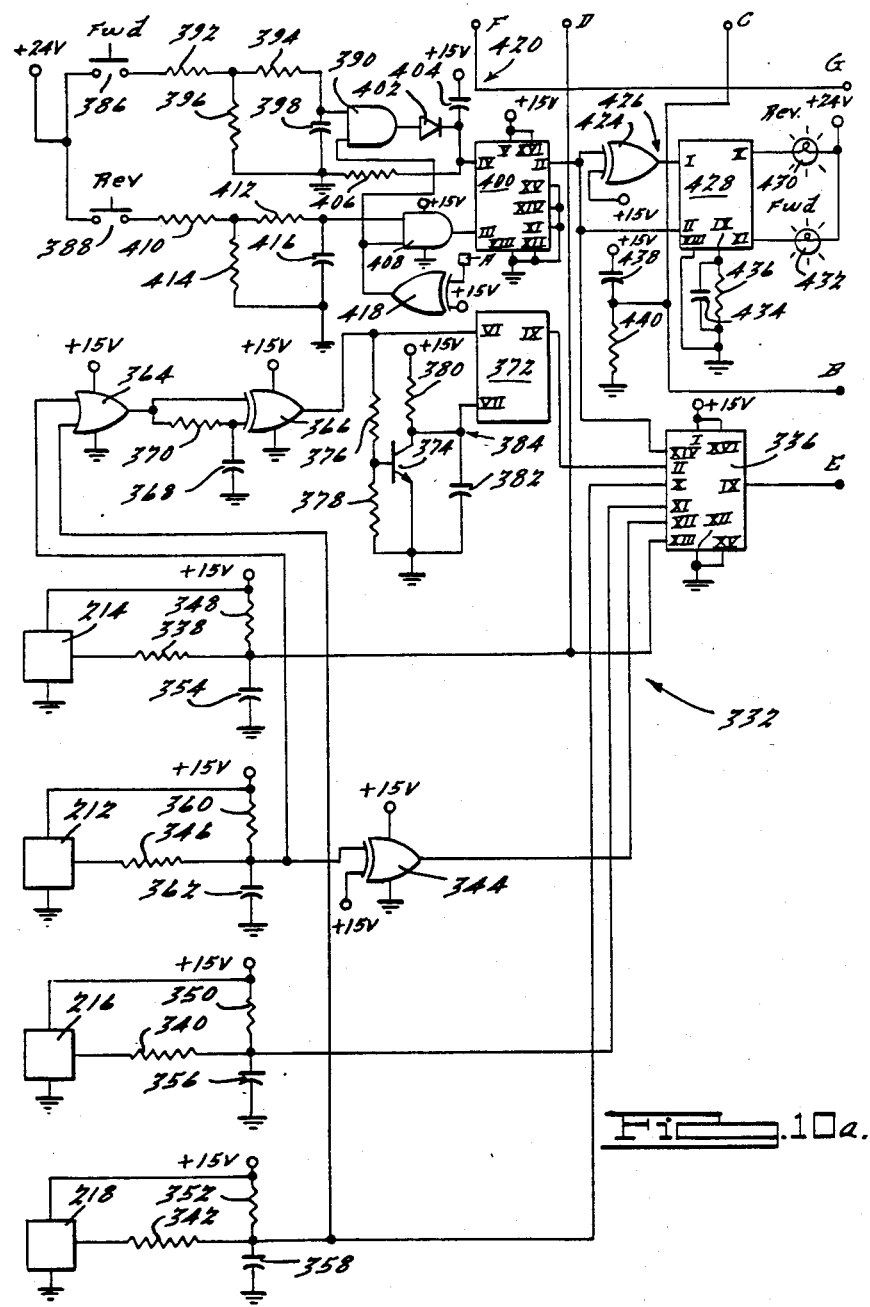
FIG. 10a, is a schematic diagram of a forward-reverse signal conditioning circuit forming a portion of the control circuit of FIG. 2.

Referring to FIG. 10a, a forward-reverse signal conditioning circuit, shown generally at 332, is illustrated. One input of each of sensors 212, 214, 216 and 218 are connected to a +15 VDC power supply which will be described in detail herein below, through a local printed circuit board filter 334 (see FIG. 10b). The remaining output of sensors 214, 216 and 218 are electrically interconnected to terminals XIII, XI and X, respectively, of a type 4539 1 of 4 CMOS selector gate 336 through separate current limiting resistors 338, 340 and 342, respectively. The terminals designated by Roman numerals herein represent those specified by the manufacturer of a particular solid state device employed by the applicant. It is understood that any number of suitable alternative devices could be substituted and thus the specific devices called out herein and their characteristic terminal configurations are not to be considered limiting in any sense.

The output of sensor 212 is electrically interconnected to one input of an exclusive OR gate 344 through a current limiting resistor 346. The remaining input of gate 344 is connected to the +15 VDC power supply. Terminals XIII, XI and X of selector 336 are interconnected to the +15 VDC power supply through 4.7k pull-up resistors 348, 350 and 352, respectively, and to ground through 0.01 microfarad capacitors 354, 356 and 358, respectively. The input of gate 344 connected to resistor 346 is also interconnected to the +15 VDC power supply through a 4.7k resistor 360 and to ground through 0.01 microfarad capacitor 362. The output of gate 344 is connected to input XII of selector 336.

The input of gate 344 connected to resistor 346 also electrically connected to one input of an OR gate 364. Terminal X of selector 336 is electrically connected to the remaining input of OR gate 364. The output of OR gate 364 is electrically connected to one input of an exclusive OR gate 366. The remaining input of exclusive OR gate 366 is interconnected to ground through a 0.01 microfarad capacitor 368 and interconnected to the output of OR gate 364 through a 5.1k resistor 370. Resistor 370 and capacitor 368 operate to establish a phase lag.

The output of exclusive OR gate 366 is connected to S terminal VI of a type 4043 flip-flop 372 and interconnected to the base of an NPN transistor 374 through a 10k resistor 376. The emitter of transistor 374 is electrically connected to ground and the base thereof is interconnected to ground through a 1k resistor 378. The collector of transistor 374 is interconnected to the +15 VDC power supply through a 100k resistor 380, to ground through a 50 microfarad capacitor 382 and directly connected to R terminal VII of flip-flop 372. Flip-flop 372 as well as its associated componentry function as a zero rotor speed detector, shown generally at 384, which outputs the zero speed select signal from Q terminal IX of flip-flop 372 to terminal II of selector 336.

Forward and reverse directional mode select switches, 386 and 388, respectively, are provided within the passenger compartment area of electric vehicle 10. Both switches 386 and 388 are normally open, momentary contact single pole types, having one terminal thereof connected to a +24 VDC tap 389 (see FIG. 10e) in battery 40. The remaining terminal of switch 386 is interconnected to one input of an AND gate 390 through a series combination of a 6.2k resistor 392 and a 20k resistor 394. The point of common connection between the resistors 392 and 394 is interconnected to ground through a 10k resistor 396. The terminal of AND gate 390 connected to resistor 394 is interconnected to ground through a 20 microfarad capacitor 398. The output of AND gate 390 is interconnected to S terminal IV of a type 4043 flip-flop 400 through a forward biased signal diode 402. Terminal IV of flip-flop 400 is interconnected to the +15 VDC power supply through a 2.2 microfarad capacitor 404 and to ground through a 100k resistor 406.

The remaining terminal of reverse switch 388 is interconnected to one input terminal of an AND gate 408 through a series combination of a 6.2k resistor 410 and 20k resistor 412. The point of common connection between resistors 410 and 412 is connected to ground through a 10k resistor 414. The input terminal of AND gate 408 connected to resistor 412 is also interconnected to ground through a 20 microfarad capaciator 416. The output of AND gate 408 is connected to R input terminal III of flip-flop 400. An exclusive OR gate 418 has one input connected to a terminal A. Terminal A is connected to a complimentary terminal A in FIG. 10c. The remaining input terminal to exclusive OR gate 418 is connected to the +15 VDC power supply. The output of exclusive OR gate 418 is connected directly to the remaining input of AND gate 390 and the remaining input of AND gate 408. Terminals V and XVI of flip-flop 400 are connected to the +15 VDC power supply and terminals VIII, XII, XI, XIV and XV are connected to ground. Flip-flop 400 and its associated componentry operates as a latch, indicated generally at 420, which outputs a forward/reverse select signal from Q terminal II of flip-flop 400 to terminal XIV of selector 336.

Terminal II of flip-flop 400 is also connected to one input of an exclusive OR gate 424 of a display driver circuit, shown generally at 426. The remaining input of exclusive OR gate 424 is connected to the +15 VDC power supply. The output of exclusive OR gate 426 is connected to terminal I of a type ULN2004A lamp and relay driver 428. Terminal II of flip-flop 400 is directly connected to terminal II of driver 428. Terminals X and XI of driver 428 are interconnected to the +24 VDC battery tap 389 through reverse and forward directional mode display lights 430 and 432, respectively, located within the passenger compartment of electric vehicle 10. Terminal VIII of driver 428 is connected to ground. Terminal IX of driver 428 is interconnected to ground through a parallel combination of a 1.4 microfarad capacitor 434 and a 4.7k resistor 436.

The +15 VDC power supply is electrically connected to ground through a series combination of a 15 microfarad capacitor 438 in a 51k resistor 440. The point of common connection between capacitor 438 and resistor 440 is directly connected to a terminal B and a separate terminal C. Capacitor 438 and resistor 440 operate to output an initialization or start-up pulse on terminals B and C. Terminal XIII of selector 336 is connected to a terminal D and terminal IX of selector 336 is connected to a terminal E. Finally, terminals F and G are directly interconnected with one another.

One of four selector 336 operates to connect or enable one of the sensors 212, 214, 216 or 218 as a function of vehicle (motor) speed and directional mode selection via the forward/reverse select signal. If electric vehicle 10 is below a predetermined threshold speed and forward switch 386 is momentarily closed, the output of AND gate 390 goes high. Likewise, if reverse switch 388 is momentarily closed, the output of AND gate 408 goes high.

One of four selector 336 will thus receive both the forward/reverse select and zero speed select signals and interconnect one of sensors 212, 214, 216 or 218 to output terminals E to effect a particular applied voltage leading angle, according to the following truth table:

| 1 of 4 Selector Truth Table | | |
|---|---|---|
| Zero Speed | FWD/REV | Enabled Sensor |
| 0 | FWD | −15° (212) |
| Not 0 | FWD | −4° (214) |
| 0 | REV | +15° (218) |
| Not 0 | REV | +4° (216) |

In the version of the invention illustrated in FIGS. 3 and 4, sensor 182 and its associated sensor positioner 188 substantially replace the function of sensors 212, 214, 216 and 218 and one of four selector 336. In that case, the applied voltage leading angle will be established by control circuit 204 as described hereinabove.

(ii) Motor Positioning Circuit

Referring to FIG. 10b, a motor positioning circuit indicated generally at 442, as well as typical P.C. board filter 334 is illustrated. Filter 334 is reproduced on each logic P.C. board within control circuit 44. Each filter 334 has input terminals 441 connected to ±15 VDC output terminals of the main logic power supply and ±15 VDC output terminals 443 connected to each separate +15 VDC and −15 VDC terminal on its associated board. Each filter 334 includes a positive bus 444 and a negative bus 446. Busses 444 and 446 are interconnected by series combinaton of two 0.022 microfarad capacitors 448 and 450. The point of common connection between capacitors 448 and 450 are connected to ground. Likewise, busses 444 and 446 are interconnected by series combination of two 15 microfarad tantalum capacitors 452 and 454. The point of common connection between capacitors 452 and 454 are also connected to ground.

Hall effect sensor 186 has one terminal connected directly to the +15 VDC power supply and a second terminal interconnected to the TR+ terminal IV of a type 4098 CMOS timer circuit 462 through a current limiting resistor 460. Terminal IV of timer 462 is interconnected to the +15 VDC power supply through a 4.7k resistor 456, and to ground through a 0.01 microfarad capacitor 458. As in the case of sensors 212, 214, 216 and 218, resistors 456 and 460 and capacitor 458 provide signal conditioning. The point of common connection of resistor 456 and capacitor 468 is connected to an input terminal of an exclusive OR gate 464. The Q terminal VII of timer 462 is connected to the clock terminal III of a type 4013 flip-flop 466. Terminals VIII and XIII of timer 462 are connected to ground and terminals V, XVI and III of timer 462 are connected to the +15 VDC power supply. Terminal I of timer 462 is interconnected with the +15 VDC power supply by a series combination of a 0.22 microfarad capacitor 468 and a 390k resistor 470. The point of common connection between resistor 470 and capacitor 468 is connected to terminal II of timer 462. Data terminal V of flip-flop 466 is connected to the +15 VDC power supply, and terminals VI, VII and VIII of flip-flop 466 are connected to ground. Terminals X and XIV of flip-flop 466 are connected to the +15 VDC power supply. RH terminal IV of flip-flop 466 is connected to RH terminal X of a type 4013 flip-flop 472 and to terminal F. Q terminal I of flip-flop 466 is connected to terminal I of a type 2905 timer 474. Terminal VII of timer 474 is connected to clock terminal XI of flip-flop 472. Q terminal XII of flip-flop 472 is interconnected to the gate of a power MOSFET 476 through a 100 ohm resistor 478.

The source of FET 476 is connected to ground and the drain of FET 476 is connected to the +24 VDC battery tap 389 through a parallel combination of solenoid coils 268 and 308. Additionally, the drain of FET 476 is connected to the anode of a free wheeling diode 480, the cathode of which is connected to the +24 VDC battery tap 389. Flip-flop 472, FET 476, resistor 478, diode 480 and coils 308 and 268 constitute a solenoid actuation circuit 481. Diode 480 is provided for protection of FET 476. Additionally, it is contemplated that any production embodiment of the present invention would include a fuse disposed intermediate coils 308 and 268 and +24 VDC tap 389.

Terminals V and VI of timer 474 are connected to the +15 VDC power supply. Terminal II of timer 474 is interconnected to ground through a series combination of an 826k resistor 482 and a 2.2 microfarad capacitor 484. The point of common connection between resistor 482 and capacitor 484 is connected to terminal III of timer 474. Terminals IV and VIII of timer 474 are directly connected to ground. Terminal VII of timer 474 is connected to one input of an AND gate 486, to ground through a 10k resistor 488 and to both inputs of a NOR gate 490. The output of NOR gate 490 is connected to one of the inputs of an AND gate 492. The other input of AND gate 492 is interconnected to a terminal H through a 10k resistor 494. The output of AND gate 492 is connected to one of the inputs of a NOR gate 496. The output of AND gate 486 is connected to the remaining input of NOR gate 496. The output of NOR gate 496 is connected to a terminal I. The remaining input terminal of AND gate 486 is connected to the input terminal of exclusive OR gate 464 which is connected to terminal IV of timer 462. The output of exclusive OR gate 464 is interconnected to terminal C through a 1k resistor 498.

Sensor 186 is designated the electrical stop sensor inasmuch as it is used only for electronically stopping motor 18. Specifically, sensor 186 is employed for centering rotor 26 on a high torque parking position and to control the rotor current toggling as described hereinabove. In addition to being tied into minimum RPM timer circuit 462, sensor 186 is input to exclusive OR gate 464 along with the −4° sensor 214. Exclusive OR gate 464 selects direction reversal and is connected to one of the inputs of exclusive OR gate 500 in FIG. 10c.

Q output VII of timer circuit 462 goes low when rotor speed falls below 20 RPM. Q output I of flip-flop 466 will then go high when speed is below 20 RPM and the accelerator pedal has been released. This will output a two second pulse from timer 474 and a two second low output from OR gate 490. During these two second intervals, terminal XI of flip-flop 472 will go high and Q terminal XII will be latched low, deenergizing solenoid coils 268 and 308. Additionally, the output of OR gate 490 is input to AND gate 492 along with the output of one of four selector 336. The pulse from timer 474 is also fed to AND gate 486 with the output of sensor 186. AND gate 486 will output a two second pulse to the input of OR gate 496 along with the output of AND gate 492 to feed a control signal to the remaining input of exclusive OR gate 500 of FIG. 10c.

(iii) Current Demand Logic and Minimum Starting Speed Circuit

Figure 10C:
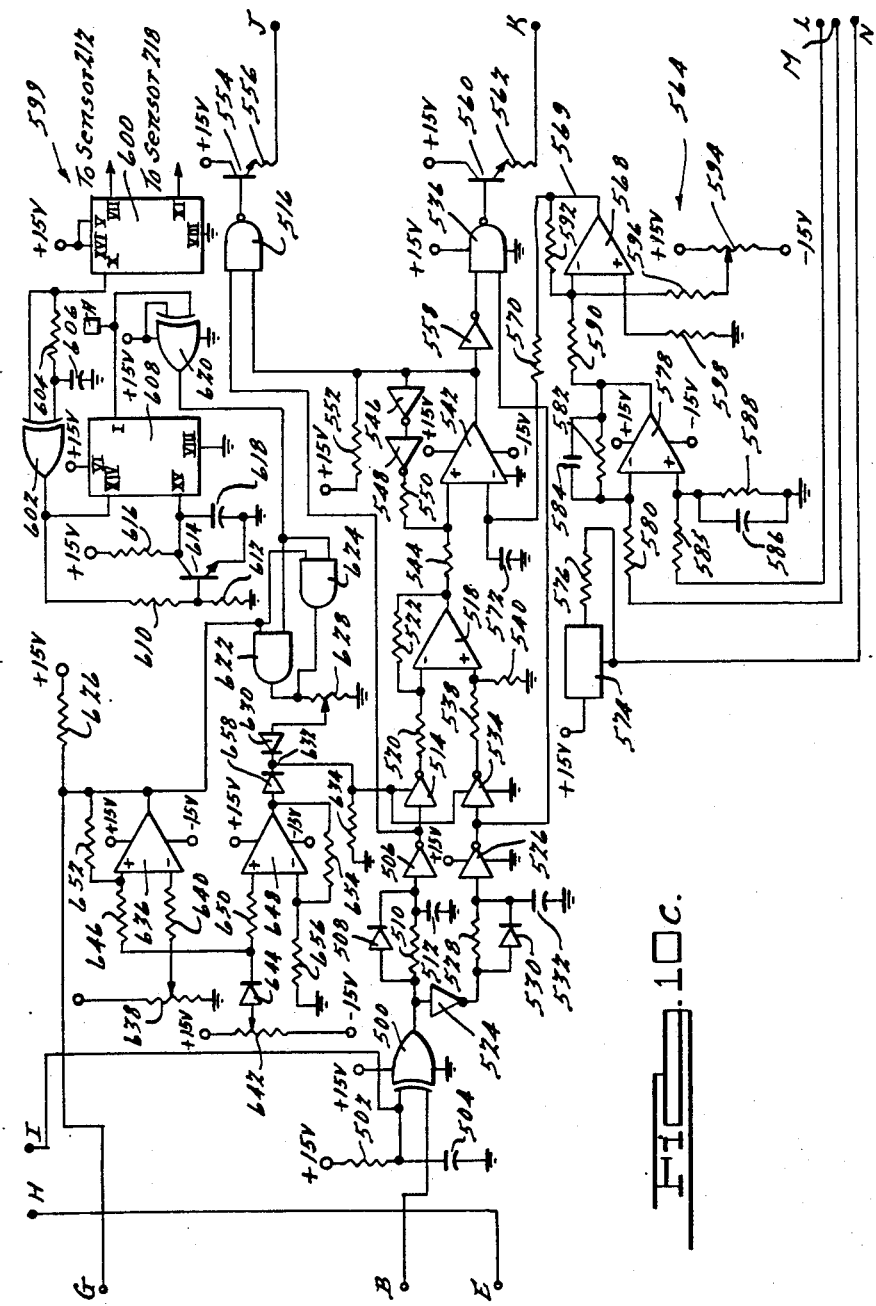
FIG. 10c, is a schematic diagram of a current demand logic circuit and a minimum starting speed circuit forming a portion of the control circuit of FIG. 2.

Referring to FIG. 10c, terminal E is directly connected to terminal H. Terminal B is connected to one of the inputs of an exclusive OR gate 500. The remaining input of exclusive OR gate 500 is connected to terminal I and the point of common connection between a 47k resistor 502 and a 0.01 microfarad capacitor 504 which are interconnected between the +15 VDC power supply and ground. The output of exclusive OR gate 500 is interconnected with the input of an inverter 506 through a parallel combination of a signal diode 508 and an 80.6k resistor 510. The input of an inverter 506 is tied to ground through a 470 microfarad capacitor 512. The output of inverter 506 is connected to the input of inverter 514 and to one input of a NAND gate 516. The output of inverter 514 is interconnected with the negative input of an operational amplifier 518 through a 15k resistor 520. The output of amplifier 518 is interconnected with its negative input through a 10k feedback resistor 522.

The output of exclusive OR gate 500 is also connected to the input of an inverter 524. The output of inverter 524 is interconnected to the input of another inverter 526 through a parallel combination of an 80.6k resistor 528 and a signal diode 530. The input of inverter 526 is connected to ground through a 470 picofarad capacitor 532. The output of inverter 526 is connected to the input of another inverter 534 and to one of the inputs of a NAND gate 536. The output of inverter 534 is interconnected to the positive input of operational amplifier 518 through a 15k resistor 538. The positive input of amplifier 518 is also connected to ground through a 10k resistor 540.

The output of amplifier 518 is interconnected with the positive input of a comparator 542 through a 2k resistor 544. The output of comparator 542 is interconnected with the positive input thereof through a series combination of two variable output voltage inverters 546 and 548 and a 100k resistor 550. The output of comparator 542 is also interconnected to a +15 VDC power supply through a 11k resistor 552 and to the remaining input of NAND gate 516. The output of NAND gate 516 is connected to the base of a transistor 554. The collector of transistor 554 is connected to the +15 VDC power supply and the emitter of transistor 554 is interconnected to a terminal J through a 470 ohm resistor 556. The output of comparator 542 is interconnected to the remaining input of NAND gate 536 through an inverter 558. The output of NAND gate 536 is connected to the base of a transistor 560. The collector of transistor 560 is connected to the +15 VDC power supply and the emitter of transistor 560 is interconnected to a terminal K through a 470 ohm resistor 562.

An amplifier shown generally at 564 receives an input from a fast response current sensor 566 (see FIG. 10e) through terminals L, M and N and outputs a sensed motor current signal from the output of an amplifier 568. A line 569 interconnects the output of amplifier 568 with the negative input of comparator 542 through a 2k resistor 570. The negative input of comparator 542 is also connected to ground through a 0.068 microfarad capacitor 572. Terminal N is directly connected to a constant current power supply 574 and interconnected with a second terminal of power supply 574 through a 390 ohm current control resistor 576. Power supply 574 is connected to the +15 VDC power supply and operates in a manner well known in the art. Terminal M is interconnected to the negative input of an operational amplifier 578 through an 11k resistor 580. The output of amplifier 578 is interconnected with the negative input thereof through a parallel combination of a 110k resistor 582 and a 0.001 microfarad filter capacitor 584. Terminal L is interconnected to the positive input of amplifier 578 through a 11k resistor 585. The positive input of amplifier 578 is also interconnected to ground through a parallel combination of a 0.001 microfarad filter capacitor 586 and a 110k resistor 588. The output of amplifier 578 is interconnected with the negative input of amplifier 568 through a 11k resistor 590. The output of amplifier 568 is interconnected with its negative input through a 110k feedback resistor 592. The negative input of amplifier 568 is interconnected to the wiper of a 100k ohm potentiometer 594 having one end tap connected to the +15 VDC power supply and the other end tap connected to the −15 VDC power supply, through a 110k resistor 596. The positive input of amplifier 568 is interconnected with ground through a 4.99k resistor 598.

A type 4043 flip-flop 600 has its S terminal VII connected to sensor 212 and its R terminal connected to sensor 218. Q terminal X is connected directly to one input of an exclusive OR gate 602. Terminal X of flip-flop 600 is also interconnected to the remaining input of exclusive OR gate 602 through a 50k resistor 604. The remaining input of exclusive OR gate 602 is also interconnected to ground through a 0.1 microfarad capacitor 606. Terminals XVI and V of flip-flop 600 are connected to the +15 VDC power supply and terminal VIII thereof is connected to ground. The output of exclusive OR gate 602 is connected directly to S terminal XIV of a type 4043 flip-flop 608 and interconnected to ground through a series combination of a 20k resistor 610 and 1k resistor 612. The point of interconnection between resistors 610 and 612 is connected to the base of a transistor 614. The collector of transistor 614 is interconnected to the +15 VDC power supply through a 100k resistor 616 and to ground through a 10 picofarad capacitor 618. The emitter of transistor 614 is connected directly to ground. The collector of transistor 614 is connected directly to R terminal XV of flip-flop 608. Terminal VIII of flip-flop 608 is connected directly to ground and terminal VI thereof is connected to the +15 VDC power supply. Terminal I of flip-flop 608 is connected terminal A as well as one input of an exclusive OR gate 620. The remaining input of exclusive OR gate 620 is connected to the +15 VDC power supply. The output of exclusive OR gate 620 is connected directly to one of the inputs of each of separate AND gates 622 and 624. The remaining inputs of AND gates 622 and 624 are commonly interconnected to +15 VDC power supply through a 10k resistor 626. The outputs of AND gates 622 and 624 are commonly connected to one end tap of a 20k potentiometer 628. The remaining end tap of potentiometer 628 is connected to ground and its wiper is connected to the anode of a signal diode 630. The cathode of diode 630 is connected to a node, designated as 632. Node 632 is interconnected to ground through a 100k resistor 634 and directly to the supply inputs of variable output voltage inverters 514 and 534 as well as inverters 546 and 548. Terminal G is connected to the output of an operational amplifier 636 and to the input of AND gate 622 connected to resistor 626. Terminal I is connected to the input of exclusive OR gate 500 connected to resistor 502.

A 20k, voltage preset potentiometer 638 has one end tap thereof connected to the +15 VDC power supply and other end tap connected to ground. The wiper of potentiometer 638 is interconnected to the negative input of amplifier 636 through a 100k resistor 640. An accelerator pedal actuated 100k potentiometer 642 has one end tap connected to the +15 VDC power supply and the other tap connected to the −15 VDC power supply. The wiper of potentiometer 642 is connected to the anode of a signal diode 644. The cathode of diode 644 is interconnected to the plus input of amplifier 636 through a 100k resistor 646 and to the positive input of an operational amplifier 648 through a 100k resistor 650. The output of amplifier 636 is interconnected with its positive input through a 10M feedback resistor 652. The output of amplifier 648 is interconnected with its negative input through a 1k feedback resistor 654. The negative input of amplifier 648 is also interconnected to ground through a 1k resistor 656. The output of amplifier 648 is also connected to the anode of a signal diode 658 whose cathode is connected to node 632.

During normal operation, the output of one of four selector 336 is effectively connected to the upper input of exclusive OR gate 500 and the lower input thereof is high. During stopping of motor 18, the upper input of gate 500 is tied to sensor 186 and the lower input is toggled so motor 18 oscillates around the 30° or stopping sensor 186.

The operator demand is input from potentiometer 642 into noninverting amplifier 648 which, in turn, outputs a current command signal through node 632 to buffering inverters 514 and 534. The driver demand signal is also input into comparator 636 whose output is low when no pressure on the accelerator pedal is present. Potentiometer 638 establishes a predetermined reference level.

During normal operation, the output of exclusive OR gate 500 outputs a signal to a fast on-delayed off delay circuit for the prevention of cross-firing. From there the signal is fed through successive buffering inverters 506 and 514, and into one of the inputs of amplifier 518. Likewise, the output of exclusive OR gate 500 is inverted and passed through a delay circuit and successive buffering inverters 526 and 534. Inverters 506 and 526 are not accelerator pedal sensitive, and inverters 514 and 534 are accelerator pedal sensitive by virtue of their receiving the current command signal. The outputs of buffers 514 and 534, which are proportional in amplitude to current demand and at a frequency determined by the motor position sensors, are input into a gain circuit composed of amplifier 518 and resistors 522 and 540. The output of the gain circuit is fed to the input of a hysteresis circuit including comparator 542 which also inputs the current sense signal from amplifier 564. The positive input feedback loop of comparator 542 includes inverters 546 and 548, which are accelerator pedal sensitive. The interconnection of inverters 548 and 546 with the accelerator circuit is not illustrated. The hysteresis circuit is output to complimentary NAND gates 516 and 536, which also include inputs from the output of buffering inverters 506 and 526, respectively, as a verification of the receipt of a control signal to eliminate false triggering by verifying that the signal was sent from the delay circuit. The output of NAND gates 516 and 536 are then fed to complimentary base drive circuits as will be described in detail hereinbelow.

Power supply 574 outputs a constant current signal to terminal N which is subsequently energizes a motor current sensor. Two lines are fed back from the sensor via terminals L and M to the inputs of amplifier 578. The difference of these signals is output to amplifier 568 which generates the motor current signal.

The minimum starting speed circuit 599 has inputs from the +15° and −15° sensors 212 and 218 to flip-flop 600, which outputs a signal from Q terminal X to one of the inputs of exclusive OR gate 602 and to the remaining input of exclusive OR gate 602 through a phase delay circuit composed of resistor 604 and capacitor 606. Minimum starting speed circuit 599 eliminates cogging and prevents entrapment of rotor 26 in the zero electrical torque position. Exclusive OR gate 602 outputs a signal to flip-flop 608 which functions as a zero speed detector circuit to output a high signal on Q terminal I when speed exceeds 20 RPM. That signal is also fed to latch 420 through an exclusive OR gate 418 in FIG. 10a. Exclusive OR gate 620 will then output an override demand signal to node 632 through gates 622, 624 and potentiometer 628 which, in some circumstances, will override the torque demand signal. The remaining inputs for gates 622 and 624 are from the output of amplifier 636 and receive a high signal when pressure exits on the throttle pedal.

If there is pressure on the accelerator pedal and rotor speed is below 20 RPM, the control signal will be established by potentiometer 628 which forces a minimum torque demand current until the operator releases the accelerator pedal or rotor speed exceeds 20 RPM.

By way of example, when the vehicle operator releases the accelerator pedal and rotor 26 of motor 18 is slowing down, node 632 goes low and disconnects the reset inputs on flip-flops 466 and 472 (FIG. 10b). If the pulse received from sensor 186 is longer than the RC time constant of resistor 470 and capacitor 468, then latch 462 will output a pulse on Q terminal VI thereof. This trips timer 474, which outputs a high pulse for two seconds and simultaneously releases solenoid coils 268 and 308. It is to be understood that the two second time period has been established for a given machine and may vary from application to application depending upon the machine's momentum and other criteria. During the two second pulse, the output of one of four selector 336 is input to exclusive OR gate 500 with the output of sensor 186. This will provide toggle logic into gate 500 which instructs it to invert or not invert the main logic signal. This toggling will dither the critically damped rotor 26 about one of the parking positions. After the two second interval, the command is returned to one of four selector 336.

Continuing the example, in the acceleration mode, the output of amplifier 648 will go high in response to throttle pedal being depressed and will reset flip-flops 466 and 472 and simultaneously energize solenoid coils 268 and 308.

Amplifier 648 outputs torque command signal through node 632. However, the larger of the torque signal or the minimum start torque signal from minimum starting speed circuit 599 will be applied to the gain circuit. When rotor speed exceeds 20 RPM, Q terminal I of flip-flop 608 goes low. Thereafter, flip-flop 600 and sensors 212 and 218 comprise an anti-oscillation circuit. If motor 18 does not have enough kinetic energy to move the vehicle load, rebound will occur and potentially could cause an oscillating condition. The +15° and −15° sensors 218 and 212, respectively, mandate the oscillation through an unreal 30° range, which effectively prohibit oscillation from occurring. It can be seen that the +15° and −15° sensors 218 and 212, respectively, are only required if the motor stops at zero torque point.

After 20 RPM is exceeded, the RC constant of resistor 616 and capacitor 618 is such that it cannot ramp up, preventing flip-flop 608 from being reset. Q output I of flip-flop 608 will thus always be high, as will the outputs of exclusive OR gate 620 and AND gate 622, which commands minimum gain.

If the output of exclusive OR gate 500 is high, the output of buffering inverter 506 goes low, and the upper input of AND gate 516 goes low. Also, buffering inverter 526 output will go high and the lower input of AND gate 536 will go high. The outputs of buffering inverters 514 and 534 are opposites by virtue of inverter 524 and are multiplied by the gain circuit. If the output of buffering inverter 514 is high, the output of buffering inverter 534 is low and the output of amplifier 518 goes negative. This output is compared with motor current. In the starting mode, the output of comparator 542 is low, the lower input of AND gate 516 is low and the upper input of AND gate 536 is high. Thus, the control signal imparted to the base drive circuits is a function of gain or pedal position, sensed motor current and hysteresis. When the sensed motor current exceeds commanded torque current, comparator 542 is shut off to disable the transmission of further control signals and the generation of switch command signals.

(iv) Base Drive Circuits

Referring to FIG. 10d, identical first and second base drive circuits, 660 and 662, respectively, are illustrated. During normal operation, base drive circuit 660 and base drive circuit 662 will alternatingly receive control signals from current demand logic circuit 499 via terminals J and K. Each circuit 660 and 662 processes a received control signal and inputs a switch command signal to the base of transistor 56 or 62, respectively. Because circuits 660 and 662 are identical, the specific configuration and operation of only one will be given for the sake of brevity.

Terminal J is connected to the anode of an LED of a type 6N135 optical coupler 664. It is contemplated that other fast response type commercially available equivalents can be substituted. The cathode of the LED is interconnected to ground through a 470 ohm resistor 666. The anode of the photodiode portion of optical coupler 664 is connected to the base of a transistor 668. In the components selected by the applicant for the illustrated embodiment of the invention, transistor 668 is integrally formed with optical coupler 664. However, it is shown as a discrete element for purposes of clarity. The cathode of the photodiode is connected to the +4 VDC power supply. The collector of transistor 668 is interconnected to the +4 VDC power supply through a 10k resistor 670 and interconnected to both inputs of an a NOR gate 672 through a 47k resistor 674. The emitter of transistor 668 is interconnected to ground through a parallel combination of a 1,000 microfarad capacitor 676 and a 0.1 microfarad capacitor 678. Capacitors 676 and 678 comprise a negative base drive power supply filter circuit shown generally at 680. The output of NOR gate 672 is connected to both inputs of another NOR gate 682. The output of NOR gate 682 is directly connected to one of the inputs of a NOR gate 684 and interconnected to the inputs of NOR gate 672 through a 1M hysteresis resistor 686. The output of NOR gate 682 is interconnected to the +4 VDC power supply through a series combination of a 200 picofarad capacitor 688 and a 100k resistor 690. The +4 VDC power supply is also interconnected to ground through a parallel combination of a 1000 microfarad capacitor 692 and a 0.1 microfarad capacitor 694. The point of common connection between capacitor 688 and resistor 690 is connected to one of the inputs of a NAND gate 696. The +4 VDC power supply is connected to the emitter of a transistor 698 whose collector is interconnected to the −4 VDC power supply through a 10k resistor 700. The collector of transistor 698 is also connected to both inputs of a NAND gate 702 whose output is connected to the remaining input of NAND gate 696. The output of NAND gate 696 is connected to both inputs of a NAND gate 704 whose output is connected to the remaining input of NOR gate 684. The output of NOR gate 684 is connected to both inputs of a NOR gate 706 whose output is interconnected to the base of a power transistor 708 through a 2.7k resistor 710.

The emitter of transistor 708 is connected to the emitter of transistor 668 and to the −4 VDC power supply. The collector of transistor 708 is interconnected to the +4 VDC power supply through a 27 ohm resistor 712. The collector of transistor 708 is connected to the anode of a small power diode 714 and to the base of a power transistor 716. The cathode of diode 714 is interconnected to the base of transistors 698 through a 100k resistor 718 and to the base of the driver transistor 56. The base of transistor 698 is also connected to the anode of a signal diode 720 whose cathode is connected to the +4 VDC power supply. The collector of transistor 716 is connected to the +4 VDC power supply. The emitter of transistor 716 is interconnected to the emitter of a power transistor 722 through a 3.9 ohm resistor 724. The collector of transistor 708 is connected to the base of transistor 722 and the collector of transistor 722 is connected to the −4 VDC power supply. The emitter of transistor 716 is connected to the base of power transistor 56 through line 66. The collector and emitter of power transistors 56 are connected to terminals O and P, respectively.

Terminal K of base driver circuit 662 is likewise connected to an optical coupler 726. The collector and emitter of power transistor 62 are connected to terminals Q and R, respectively. Finally, terminals L, M and N are directly connected to terminals S, T and U, respectively.

During normal operation, base drive circuits 660 and 662 will alternately be on when a control signal is received at terminals J or K. The power transistor, 56 or 62, associated with the base driver circuit which is "on", remains in saturation (after initial turn on). During such times, the input to that base drive circuit 660 or 662 is high. When optical coupler 664 is on, power transistor 56 will be on and when optical coupler 726 is on, power transistor 62 will be on.

By way of example, when power transistor 56 is on or conducting, and is to be turned off, the control signal received at optical coupler 664 is terminated. The collector voltage of transistor 668 will rise to four volts. The output of NOR gate 682 will then go high. The output of NOR gate 706 will also go high turning on transistor 708. Transistor 708 going on will turn off transistor 716 and turn on transistor 722, which, in turn, will pull current from power transistor 56 to the −4 VDC power supply, turning off transistor 56.

Base drive circuits 660 and 662 provide protection when power transistors 56 and 62 are out of saturation. Continuing the example, when power transistor 56 is off, its collector voltage will be at 96 VDC (battery voltage). Transistor 698 will be off, connecting the −4 VDC supply to both inputs of NAND gate 702. The output of NAND gate 702 will be high. During steady state conditions, the input of NAND gate 696 connected to the point of common connection between resistors 690 and 688 will have risen to +4 VDC due to the charging of capacitor 688. If power transistor 56 comes out of saturation after steady state condition has been achieved, the output of NAND gate 704 will also go high. If the input of NOR gate 684 connected to the output of NAND gate 704 is high, then the output of NOR gate 706 will also be high, latching power transistor 56 off.

In the case where saturation of power transistor 56 is desired, the failsafing provided by base drive circuits 660 and 662 described immediately hereinabove is bypassed. When a control signal is received at optical coupler 664, it goes high, turning on transistor 668. The collector voltage of transistor 668 will go low as will the output of NOR gate 682. The voltage across capacitor 688 will instaneously be low, causing the input of NAND gate 696 associated therewith to go low for one R.C. time constant (20 mms). When the input of NAND gate 696 goes low, the output of NAND gate 704 will also go low. The input of NOR gate 684 connected to the output of NAND gate 704 will thus go low for one time constant. Simultaneously, the other input of NOR gate 684 is also low whereby power transistor 56 will, by default turn on into saturation. When this happens, the collector voltage of power transistor 56 goes low, turning transistor 698 on. The inputs of NAND gate 702 will go high and its output low. The input of NAND gate 696 connected to the output of NAND gate 702 will go high and its output low shutting off NAND gate 704 and driving the input of NOR gate 684 associated therewith low. As long as the other input (that connected to resistor 686) remains low, power transistor 56 cannot turn off. Power transistor 56 can only be turned off by (1) receiving a logic signal through terminal J bringing the input of NOR gate 684 high, or (2) the collector current of power transistor 56 increases to the point that the transistor comes out of saturation. In such a case, transistor 698 will lose its bias and turn off. The examplified operation of base drive circuit 660 hereinabove can be applied equally to that of base drive circuit 662.

(v) Snubber and Energy Recovery Circuit

Referring to FIG. 10e, terminals O and Q are directly connected to windings 50 and 52, respectively, of motor 18, passing through current sensor 566 in opposite directions as illustrated at loop 728. Terminals S, T and U are connected to current senor 566 which can be, for example, a linear hall effect sensor. Terminal P is interconnected to terminal O by a snubber circuit indicated generally at 730, and terminal R is interconnected to terminal Q through an identical snubber circuit 732. Snubber circuit 730 comprises a series connection of a 4 microfarad capacitor 734 and a 10 ohm resistor 736 interconnecting terminals P and O. The point of common connection between resistor 736 and capacitor 734 is connected to the cathode of a power diode 738. The anode of diode 738 is connected to terminal O. Likewise, snubber circuit 732 comprises a series combination of a 4 microfarad capacitor 740 and 10 ohm resistor 742 interconnecting terminals R and Q. The point of common connection between resistor 742 and capacitor 740 is connected to the cathode of a diode 744. The anode of diode 744 is connected to terminal Q.

Terminal O is interconnected to input line 74 through diode 76, and terminal Q is interconnected to input line 74 through diode 78. Input line 74 and output line 72 are connected to energy recovery circuit 70. Output line 72 is also connected to ground through a 7500 microfarad filter capacitor 746.

Energy recovery circuit 70 is constructed as follows. A 2500 microfarad electrolytic capacitor 748 interconnects output and input lines 72 and 74, respectively. Input line 74 is interconnected to the center tap of a primary winding 750 of an energy recovery transformer, shown generally at 752, through a line 754. Primary 750 comprises thirty two turns of 14AWG wire. Transformer 752 has a secondary winding 756 constructed of fifteen turns of 18AWG wire. Secondary winding 756 is connected to diagonally opposed corners of a bridge 758 constructed of four power diodes 760. One remaining corner of bridge 758 is connected to output line 72 and interconnected to ground through a 7.47 microfarad capacitor 762. Output line 72 is interconnected to a terminal V through a line 764. Lines 754 and 764 are interconnected by a 0.82 microfarad capacitor 766. Line 754 is interconnected to the cathode of a zener diode 768 through a 3.5k resistor 770. The anode of zener diode 768 is connected to line 764. The point of common connection between diode 768 and resistor 770 is interconnected to line 764 through a parallel combination of a 0.1 microfarad capacitor 772 and a 15 microfarad capacitor 774. The point of common connection between of resistor 770 and diode 768 is also connected to terminals IV, VI and XIV of a type 4047 low power CMOS multivibrator 776. Terminals VII, VIII, IX and XII of multivibrator 776 are connected to line 764. Terminals II and I of multivibrator 776 are interconnected by a series connected 45.5k resistor 778 and a 220 picofarad capacitor 780. The point of common connection between capacitor 780 and resistor 778 is connected to terminal III of multivibrator 776. Terminal X of multivibrator 776 is interconnected to the base of a transistor 782 through a 2.2k resistor 784. Terminal XI of multivibrator 776 is also interconnected to the base of a transistor 786 through a 2.2k resistor 788. The point of common connection between resistor 770 and diode 768 is interconnected to the gate of a power MOSFET 790 through a 470 ohm resistor 792. The collector of transistor 782 is also connected to the gate of FET 790. The point of common connection between resistor 770 and diode 768 is interconnected to the gate of a second MOSFET 794 through a 470 ohm resistor 796. The collector of transistor 786 is connected to the gate of FET 794. The emitters of transistors 782 and 786 are connected to line 764. The sources of FETs 790 and 794 are commonly interconnected to the center tap of primary winding 750 of transformer 752 through a 60 microfarad capacitor 798.

Energy recovery circuit 70 was implemented primarily due to motor 18 being bifiler wound, and because the transformer action between windings 50 and 52 is not 100% efficient. As energy is transformed between windings 50 and 52, the presence of inefficiencies due to imperfect coupling will cause some energy to remain in the winding presently transferring energy to the other. Because the point of common connection of windings 50 and 52 is connected to the positive terminal of battery 40, energy not transformed will be reflected by a potential in excess of two times the battery voltage ($V_{CC}$) which is lost as heat unless other wise recovered.

Diodes 76 and 78 operate to force bus energy on capacitor 748 which is referenced to $V_{cc}$. Capacitor 748 will thus charge so that the voltage at line 74 is twice $V_{cc}$ with respect to ground plus the reflected voltage of the nontransformed energy. Resistor 770 and zener diode 768 represent a simple, inexpensive power supply for multivibrator 776 and its associated circuitry, which comprises a free-running oscillator known generally at 777. Oscillator 777 toggles FETs 790 and 794 on and off. Transformer 752 then couples the recovered energy through diode bridge 758, back on output line 72. Unless voltage across primary winding 750 exceeds $V_{cc}$, no energy is recovered and transferred back to line 72. During normal operation, however, stray energy will be reflected in a primary voltage exceeding $V_{cc}$ which will cause recovered energy to flow back to battery 40 during operation.

(vi) Switching Power Supply Circuit

Figure 10F:
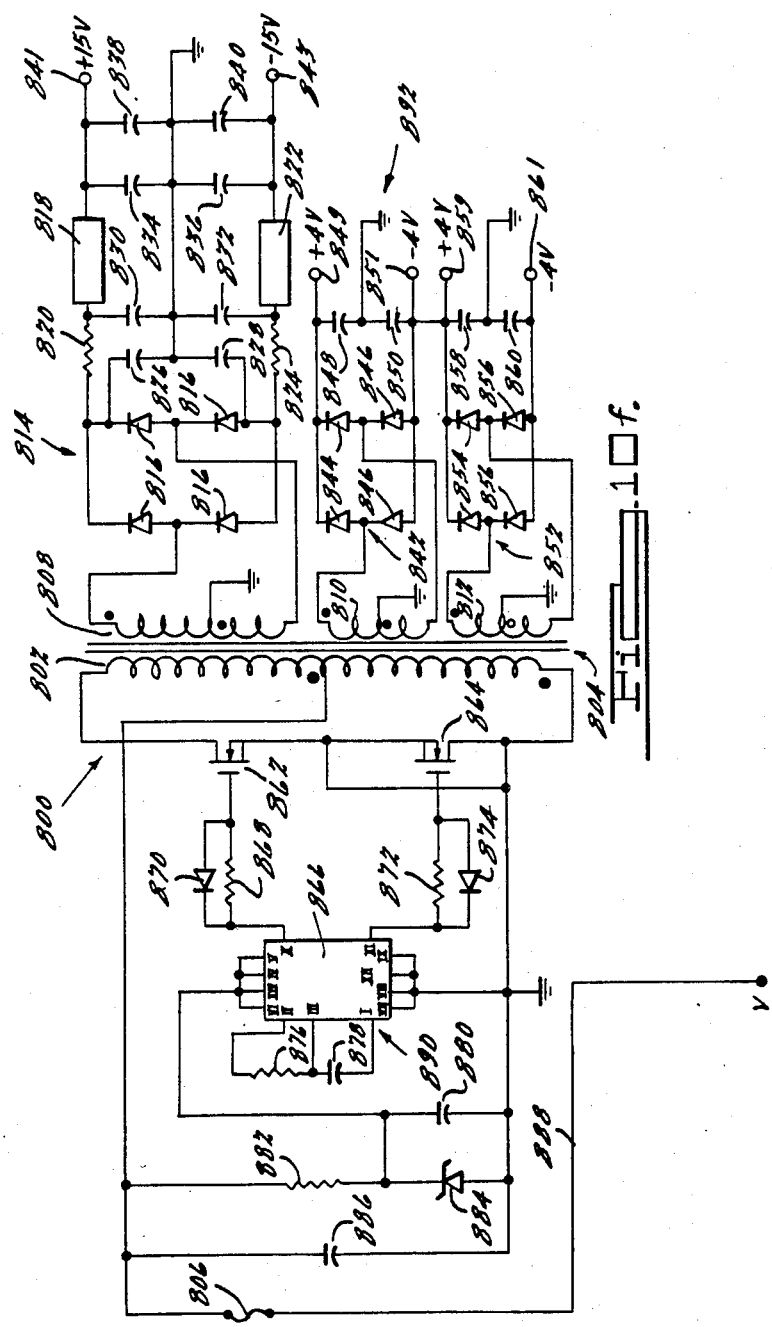
FIG. 10f, is a schematic diagram of a power supply employed within the control circuit of FIG. 2.

Referring to FIG. 10f, a switching power supply, shown generally at 800 is illustrated which powers the inverter circuit 44 and the control circuit 46. Power supply 800 has terminal V (direct from battery 40) interconnected to the center tap of a primary winding 802 of a power transformer 804 through a fuse 806. Primary winding 802 comprises 72 turns of 26AWG wire. Transformer 804 has three secondary windings 808, 810 and 812. Secondary winding 808 comprises 16 turns of 26AWG wire and has a center tap connected to ground. Both secondary windings 810 and 812 comprise 8 turns of 16AWG wire with grounded center taps. Secondary winding 808 is diagnally connected to a diode bridge 814 composed four type A114 diodes 816. One opposite corner of bridge 814 is interconnected to a type 7815 regulator 818 through a 1 ohm resistor 820. The remaining corner of bridge 814 is interconnected to a type 7915 regulator 822 through a 1 ohm resistor 824. The corner of bridge 814 connected to resistor 820 is interconnected with the corner connected to resistor 824 through a series combination of two 0.0056 microfarad capacitors 826 and 828. The point of common connection between capacitors 826 and 828 is also interconnected to the point of common connection between resistor 820 and regulator 818 through a 0.1 microfarad capacitor 830. Likewise, point of common connection between capacitors 826 and 828 is interconnected to the point of common connection between resistor 824 and regulator 822 by a 0.1 microfarad capacitor 832. The output of regulators 818 and 822 are interconnected by a series connection of two 0.1 microfarad capacitors 834 and 836 as well as a pair of series connected 15 microfarad capacitors 838 and 840. The point of common connection between capacitors 826 through 840 is connected to ground. The output of regulator 818 represents the +15 VDC power supply output terminal 841 and the output of regulator 822 represents the −15 VDC output terminal 843.

Secondary winding 810 is diagonally connected across a diode bridge 842 composed of two type A115 diodes 844 and two type A114 diodes 846. The remaining corners of bridge 842 are interconnected by series connected 15 microfarad capacitors 848 and 850, and comprise the +4 VDC and −4 VDC output terminals 849 and 851, respectively, of power supply 800. The point of common connection between capacitors 848 and 850 is connected to ground. Secondary winding 812, likewise, is connected diagonally to a diode bridge 852 composed of two type A115 diodes 854 and two type A114 diodes 856. The remaining corners of bridge 852 are interconnected by two series connected 151 microfarad capacitors 858 and 860, and comprises a second set of +4 VDC and −4 VDC output terminals 859 and 861, respectively, for power supply 800. The point of common connection between capacitors 858 and 860 is connected to ground.

Each end of primary winding 802 of transformer 804 is connected to the drain of a power MOSFET 862 and 864. The sources of FETs 862 and 864 are commonly tied to ground. The gate of FET 862 is interconnected to terminal X of a type 4047 CMOS multivibrator 866 through a 4.7k resistor 868. The gate of FET 862 is also connected to the anode of a signal diode 870. The cathode of diode 870 is connected to terminal X of multivibrator 866. Likewise, the gate of FET 864 is interconnected to terminal XI of multivibrator 866 through a 4.7k resistor 872. The gate of FET 864 is connected to the anode of a signal diode 874. The cathode of diode 874 is connected to terminal XI of multivibrator 866. Terminals I and II of multivibrator 866 are interconnected by a series connected 45.5k resistor 876 and a 220 picofarad capacitor 878. The point of common connection between resistor 876 and capacitor 878 is connected to terminal III of multivibrator 866. Terminals VII, VIII, IX, and XII of multivibrator 866 are connected to ground. Terminals IV, V, VI and XIV of multivibrator 866 are interconnected to ground through a 0.01 microfarad capacitor 880. Terminals IV, V, VI and XIV of multivibrator 866 are interconnected to the center tap of primary winding 802 of transformer 804 through a 3.5k resistor 882, and are connected to the cathode of a 12 volt zener diode 884. The anode of zener diode 884 is connected to ground. Finally, the center tap of primary winding 802 is connected to ground through a 0.082 microfarad capacitor 886.

Power supply 800 operates by including a fused line 888 connected through resistor 882 and zener diode 884 to energize multivibrator 866 as a free running oscillator shown generally at 890. Oscillator 890 toggles FETs 862 and 864 to energize the transformer 804 and the secondary circuit shown generally at 892 thereof.

The present invention provides, in effect, a high-torque, electrical motor rotor positioning system in which the rotor is parked or oscillated about the maximum electrical torque point and is thus restrained from parking (rotating) into the zero electrical torque position. As the rotor falls in speed below 20 RPM, proximity switch 186 causes a reversal of motor current each time the flag or vane portion 166a, b, or c passes thereby. This will cause the motor to reverse direction and again pass one of the vane portions by the proximity switch, causing another current reversal. Thus, the motor will oscillate or dither about the sensor which is placed so that the motor is also oscillating about the maximum electrical torque point. When the motor is subsequently started, the current reversing is then eliminated, and the normal motor current switching is employed. The motor thus could be parked indefinitely.

It must also be recognized that if a linear or incremental type position sensor were used rather than a simple on/off sensor, it would be possible to modulate the motor current and bring the rotor to the stopped position without oscillation or dithering.

However, if the vehicle is to be shut down, it has been found to be more energy efficient to employ the zero torque lockout or antidetent which mechanically locks the rotor at the point of maximum electrical torque to facilitate a subsequent start-up of the motor. As should be apparent upon reading the description of operation hereinabove, the rotor is first electrically positioned to its parking position by the toggling of motor current, and then blocking of the prestart rotor positioner is affected by the deenergization of its two solenoids. In addition to reducing start-up logic, that otherwise would be required and providing full start-up power to the motor at the instant of operator command, the present invention effectively provides a "parking detent" to protect the vehicle from rolling away on reasonable slopes or road surfaces. Although a mechanical detent arrangement is described herein, it is contemplated that, in its broadest sense, the present invention could employ alternatives thereto. For example, an electrical detent could be effected by the provision of a separate coil in the stator pole pieces which is operated when the motor is nearing zero speed. This would stop the motor at a predetermined location. An additional sensor is mounted to locate the point where the electrical torque is maximum, and the reluctance is zero. See FIG. 12a. This sensor could be used to trigger a current reversal when the motor is nearing zero speed. Thus, the motor can be stopped at a point of maximum electrical torque.

It is to be understood that the invention has been described with reference to a specific embodiment which provides the features and advantages previously described, and that such specific embodiment is susceptible of modification, as will be apparent to those skilled in the art. For example, although the present specification does not disclose a regeneration feature, i.e., the ability of the motor to act as a generator when the vehicle is coasting for momentary battery charging, the applicant contemplates that such a feature would almost certainly be found in any production or commercial electric vehicle and can be obtained with the motor and inverter described herein. It is also to be understood that although described in the environment of a passenger vehicle, in its broadest sense, the present invention can be adapted for other traction drive applications. Accordingly, the foregoing description is not be construed in a limiting sense.

What is claimed is:

1. An improved drivetrain adapted for use with an electric vehicle having at least one tractive wheel and including a power source, a single-phase brushless motor for imparting torque to said wheel and including a rotor, an inverter for providing a power input from said power source and a power output to said motor in response to switch command signals, and a control circuit operative to receive an operator demand signal and to generate said switch command signals as a function thereof, wherein said improvement comprises:

a motor positioning circuit operative to sense rotor speed and to effect rotor positioning at a fixed angular position when sensed rotor speed is below a predetermined rate to ensure the presence of a starting torque upon subsequent energization of said motor.

2. A drivetrain adapted for use with an electric vehicle having at least one tractive wheel, said drivetrain comprising:

a power source;
    a single-phase brushless motor for imparting torque to said wheel and including a rotor, said motor characterized as generating substantially zero starting torque upon energization thereof when said rotor has assumed a certain static angular position;

an inverter for providing a power input from said power source and a power output to said motor in response to switch command signals; and a control circuit operative to receive an operator demand signal and to generate said switch command signals as a function thereof, said control circuit comprising a motor positioning circuit operative to sense rotor speed and to effect rotor oscillation about a static angular position other than said zero torque position by selectively toggling motor current when sensed rotor speed is below a predetermined rate.

3. The drivetrain of claim 2, wherein said motor positioning circuit comprises timer means operative to establish a predetermined rotor parking time interval, during which said motor current toggling is effected.

4. The drivetrain of claim 3, further comprising rotor positioner means operative to selectively limit rotational freedom of said rotor independently of said switch command signals in response to an energization signal.

5. The drivetrain of claim 4, wherein said motor positioning circuit is further operative to establish said energization signal during said parking time interval.

6. The drivetrain of claim 2, wherein said other static angular position corresponds with a characteristic maximum electrical motor torque point.

7. A drivetrain adapted for use with an electric vehicle having at least one tractive wheel, said drivetrain comprising:

a fixed DC power source;

a single-phase brushless motor for imparting torque to said wheel and including a rotor, said motor characterized as generating substantially zero starting torque upon energization thereof when said rotor has assumed one of at least certain static angular positions;

an inverter for providing a power input from said power source and a power output to said motor in response to switch command signals;

flag means rotating in timed relation with said rotor;

sensor means in rotational alignment with said flag means and operative to output a signal representative of rotor position; and a control circuit operative to receive an operator demand signal and to generate said switch command signals as a function thereof, said control circuit comprising a motor positioning circuit operative to sense rotor speed and to effect rotor oscillation about a predetermined static angular position other than said zero torque position by toggling motor current as a function of said rotor position signal whenever sensed rotor speed is below a predetermined rate.

8. The drivetrain of claim 7, wherein said motor positioning circuit comprises timer means operative to establish a predetermined rotor parking time interval, during which said motor current toggling is effected.

9. The drivetrain of claim 8, further comprising rotor positioner means operative to selectively limit rotational freedom of said rotor independently of said switch command signals in response to an energization signal.

10. The drivetrain of claim 9, wherein said motor positioning circuit is further operative to establish said energization signal during said parking time interval.

11. The drivetrain of claim 7, wherein said other static angular position corresponds with a characteristic maximum electrical motor torque point.

12. The drivetrain of claim 7, wherein said motor comprises a stator adapted for mechanical grounding to a relatively stationary portion of said vehicle, and a permanent magnet external rotor disposed for rotation about the stator for magnetic interaction therewith and adapted to engage said tractive wheel.

13. The drivetrain of claim 12, wherein said flag means comprises an annular vane carried externally of said rotor and including a plurality of radially outwardly extending portions which pass in close proximity to said sensor means to effect generation of said rotor position signal.

14. A drivetrain adapted for use with an electrical vehicle having at least one tractive wheel, said drivetrain comprising:

a power source;

a single-phase brushless motor for imparting torque to said wheel and including a rotor, said motor characterized as generating substantially zero starting torque upon energization thereof when said rotor has assumed a certain static angular position;

an inverter for providing a power input from said power source and a power output to said motor in response to switch command signals; and a control circuit operative to receive an operator demand signal and to generate said switch command signals as a function thereof, said control circuit comprising a motor positioning circuit operative to sense rotor speed and to initiate a rotor parking sequence when rotor speed falls below a predetermined rate in excess of zero revolutions per minute correlating with an incipient rest condition of said wheel by rapidly toggling motor current to effect rotor oscillation about a static angular position other than said zero torque position.

15. A drivetrain adapted for use with an electric vehicle having at least one tractive wheel, said drivetrain comprising:

a power source;

a single-phase brushless motor for imparting torque to said wheel and including a rotor, said motor characterized as generating substantially zero starting torque upon energization thereof when said rotor has assumed a certain static angular position;

an inverter for providing a power input from said power source and a power output to said motor in response to switch command signals; and a control circuit operative to receive an operator demand signal and to generate said switch command signals as a function thereof, said control circuit comprising a motor positioning circuit operative to sense rotor speed and to initiate a rotor parking sequence whenever rotor speed falls below a predetermined rate in excess of zero revolutions per minute correlating with an incipient rest condition of said wheel but before said rotor comes to a complete stop by initiating a rapid toggling of motor current to effect rotor oscillation about a static angular position other than said zero torque position, said control circuit further comprising means operative to disable said motor positioning circuit whenever sensed rotor speed exceeds said predetermined rate.

* * * * *